United States Patent [19]

Caloyannides

[11] 4,032,762
[45] June 28, 1977

[54] ADJUSTABLE DIGITAL FILTER FOR HIGH SPEED DIGITAL TRANSMISSION SYSTEM

[75] Inventor: Michael A. Caloyannides, Placentia, Calif.

[73] Assignee: Rockwell International Corporation, El Segundo, Calif.

[22] Filed: Oct. 7, 1975

[21] Appl. No.: 620,532

[52] U.S. Cl. .................................. 235/152; 325/42
[51] Int. Cl.² ...................... H04B 1/10; H04B 3/04
[58] Field of Search ............ 235/152, 156; 325/42; 333/18; 328/167

[56] References Cited
UNITED STATES PATENTS

| | | | |
|---|---|---|---|
| 3,553,606 | 1/1971 | Port | 333/18 |
| 3,651,316 | 3/1972 | Gibson | 235/152 |
| 3,659,229 | 4/1972 | Milton | 333/18 |
| 3,736,414 | 5/1973 | McAuliffe | 325/42 X |

*Primary Examiner*—David H. Malzahn
*Attorney, Agent, or Firm*—H. Frederick Hamann; Rolf M. Pitts

[57] ABSTRACT

An adjustable digital filter combines the functions of a conventional digital filter and a conventional equalizer and permits elimination of the additional delay stages conventionally required for the equalizer. Reduced complexity and expense are attained, along with improved performance, since the elimination of "delay-and-add" stages required by prior art equalizers permits detection and correction of error with less delay than the prior art. Hence, improved performance is realized along with reduced cost.

30 Claims, 20 Drawing Figures

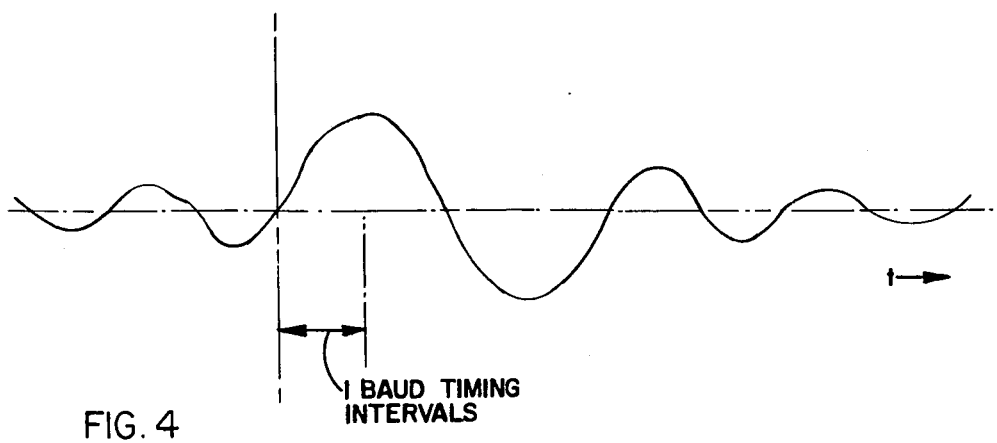
FIG. 4  1 BAUD TIMING INTERVALS
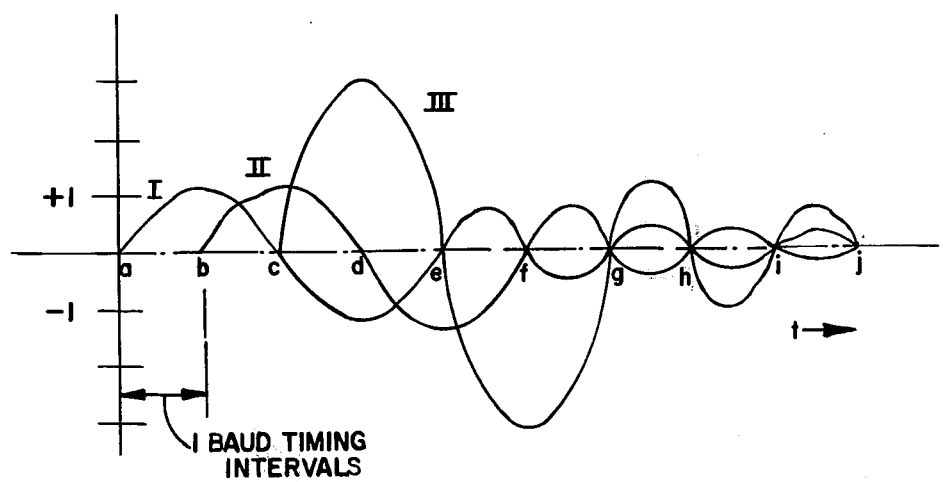
FIG. 5  1 BAUD TIMING INTERVALS

ADJUSTABLE DIGITAL FILTER FOR HIGH SPEED DIGITAL TRANSMISSION SYSTEM

BACKGROUND OF THE INVENTION

1. Field of the Invention

This invention relates to Modem systems for transmitting and receiving digital data over any kind of channel, and, more particularly, to an automatically adjustable filter for performing the functions of both a digital filter and an adaptive equalizer provided as independent, separate components of modem receivers of conventional prior art construction.

2. Discussion of the Prior Art

As is well known, most transmission channels, e.g., telephone lines, cannot accept DC signal levels, and thus digital data signals, as such, for transmission. Therefore, digital values must be converted to alternating-current (analog) form for transmission. The analog signal waveform furthermore must not contain any DC components since most channels, as staged above, will not transmit DC signals.

The data to be transmitted may be represented as conventional digital digits comprising a series of 9's and 1's. For purposes of illustration, it is assumed that a bit rate of 9600 bits per second of such digital bits is to be transmitted.

The bandwidth of the particular channel in question must, therefore, be examined to determine its capability of transmitting this or any other given level of digital bits. In FIG. 1 is shown for purposes of illustration the conventional telephone line transmission characteristic in which it is seen that the maximum frequency of the bandwidth is approximately 3,000 Hz and the minimum effective frequency is approximately 600 Hz, affording a total effective bandwidth of approximately 2400 Hz.

In accordance with the Nyquist theorum, reconstruction of a transmitted analog waveform requires that a minimum of two samples be derived for each period, i.e., complete cycle of the waveform. Thus, for a bandwidth of 2400 Hz, 4800 samples per second must be derived.

Consider an illustrative example of transmission at 9600 bits per second, and assume we wish to sample at the minimum permissible Nyquist sampling rate for a telephone channel bandwidth of 2400 Hz; it is apparent that the minimum sampling rate will be 4800 samples per second. It then follows that the illustrative 9600 bits per second requires that two bits per sample be transmitted. For this to occur, each sample is assigned one of four discrete values in accordance with the equation:

$$I = \log_x(l)$$

where $l =$ the number of levels, $I = \log_2(4) = 2$ bits per level, whereby $l = 4$ levels. To Convert from a serial stream of 1's and 0's, and where two bits per sample are to be transmitted in accordance with the foregoing, the serial bit stream is analyzed in groups of two successive digits. It is apparent that the possible combinations of digits thus are 00, 10, and 11. These then are the four levels and are suitably identified as levels 1, 2, 3, and 4 in FIG. 2A.

Although these levels 1, 2, 3, and 4 could be used, it is preferable for transmission purposes that a balanced arrangement of these levels be defined. For the levels $\pm 1$, $\pm 1$, an imbalance remains as seen in FIG. 2B; therein, the spacing of the levels $(+2) - (+1)$ and of $(-1) - (-2)$ is equal but the spacing $(+1) - (-1)$ is not.

Accordingly, the levels $\pm 1$ and $\pm 3$ are used, as shown in FIG. 2C, wherein it is now seen that the spacing of the levels $(+1) - (+3)$, $(-1) - (-3)$ and $(+1) - (-1)$ are all equal. (i.e., $\pm 2$ level unit separation)

The foregoing basic principles are illustrated with respect to a conventional modem transmitter and receiver, shown in FIG. 3. For optimum operation it is desirable that the transmitted data be as nearly random as possible. Randomness of the data may be ensured by combining the digital information to be transmitted with the output of a digital pseudo-random sequence generator 10 in a MODULO-2 adder. MODULO-2 addition of a pseudo-random sequence with the input information produces a data sequence which itself is pseudorandom. To recover the original information, the corrected received signal may be combined with the output of an identical pseudo-random sequence generator in another MODULO-2 adder in the receiver, to be described. Level converter 14 receives the two level, or binary, digital data of 1's and 0's and converts it to a four level signal as before described. Gray coder 16 receives the four level data from converter 14 and converts it to the desired $\pm 1$ and $\pm 3$ values. Impulse generator 18 receives the $\pm 1$ and $\pm 3$ level values from gray coder 2 to produce pulse-like analog voltage signals of $\pm 1$, $\pm 3$ values which are appropriate for transmission over a suitable transmission line or channel, e.g., a telephone line. (The discussion from this point on, will refer to a conventional telephone line as being the channel, only for purposes of illustration. As already stated, the disclosed technique is applicable to any channel through which it is desired to transmit digital data.)

The transmitter filter 20 is used for partially shaping the pulses from impulse generator 18 to adapt more appropriately to the telephone line in view of its (static, known) impulse response characteristics. Typically, the filter is implemented in part at the transmitter and in part at the receiver for improving the noise response characteristics of the system. The filter, of course, shapes the frequency spectrum of the pulses for compliance with the channel in question, such as the 2400 Hz bandpass of the telephone line.

Thus far, signals ranging in frequency from 0 to 2400 Hz have been produced corresponding to four level digit values at a 2400 sample rate or baud (commensurate with a 9600 bit transmission rate). Since DC levels (i.e., 0 Hz) cannot be transmitted, a modulator 22 shifts the frequency from 0 to 2400 up to 600 to 3,000 Hz. Then, the modulated signals are supplied through a level, or impedance, matcher 24 (providing a 600 Ohm output impedance) for matching the system output impedance to that of the transmission line 26. Element 24 also may include a line driver.

For the purpose of this discussion and illustrations, a baud rate has been selected which is of a level at which successive transmitted pulses, or samples, will result in over lap or interpulse interference at the receiver as a result of the bandwidth limitations of the telephone channel. Since it is a desideratum to maximize the rate of transmission, it can be considered that this overlap is essentially unavoidable. This proposition implies, as in fact is the case, that this unavoidable overlap or interpulse interference must be tailored to afford, if not an advantage, at least no difficulty. This is accomplished by a suitable tailoring of the wave shape of the transmitted pulses, typically by the filter 20.

FIG. 4 illustrates the signal which would be received at the receiver as a result of transmision of a single pulse from the transmitter, if all filtering were done at the transmitter. The waveform is plotted as a time function of the baud rate of transmission, also the sampling rate at the receiver. By forcing the wave shape shown, the illustrated waveform has measurable amplitude only at two sample points and all other portions of the waveform pass through zero amplitude at succeeding sample points. This is the familiar type IV form of Partial Response (P.R.) Coding, a detailed description of which can be found in textbooks on data communications.

Reference to FIG. 5 illustrates the effect of transmission of three successive (I, II, III) waveform samples of +1, +1, and +3 values, respectively. It is apparent that substantial overlap occurs. As indicated in FIG. 5, and as is apparent, only initialization does a unity sample value —i.e., +1 (or −1) ever result, as shown at points $b$ and $c$. At point $d$, the first (I) and third (III) signals add algebraically to provide a ±2 value. Hence, it is obvious that the signal levels acutally received can only take the values of 0, ±2, ±4 and ±6. It also is apparent that the third waveform (III) (which is the first to illustrate the overlap problem) receives its further contribution from the waveform of the pulse transmitted two baud intervals earlier. It therefore is necessary to provide a decoder at the receiver which performs the function of remembering the value of the pulse received two baud intervals (or sample times) earlier than one currently being received.

A partial response encoder is employed at the transmitter and shown as part of the generator 18. Its function is not that of enabling partial response transmission but rather to correct for, or to eliminate, the propagation errors which can result in this coding scheme. Particularly, since every sample is evaluated in part as a function of the sample two baud intervals earlier, if an error occurs in one, in the succeeding data transmission, every two decisions would continue to be in error. The partial response encoder at the transmitter eliminates this problem in a manner well known. (For a further discussion of partial response coding and transmitters, see U.S. Pat. Nos. 3,638,122 and 3,651,316, assigned to the common assignee herewith).

The conventional receiver of FIG. 6 includes a low pass filter 30 to remove noise and other hash imposed on the signal's bandwidth by the transmission line at frequencies above 3000 Hz. The demodulator 32 (which may be digital) then provides the 0 to 2400 Hz bandwidth signal and this is supplied to a further filter 33. Filter 33 matches the transmitter/receiver to the known position of the characteristics of the transmission line. An ideal waveform somewhat similar to that transmitted would result in theory — however, the telephone line itself is a filter, the characteristics of which change in time and thus a distorted waveform output is produced by filter 33. What is required, therefore, is an adaptive filter which changes its characteristics in accordance with changes in the telephone line filter-type characteristics. Accordingly, an adaptive equalizer 34 conventionally is provided to overcome the shortcomings of the telephone line. It is significant that adpative equalizers are always digital in implementation, since analog implementations are prohibitively complex.

Accordingly, a suitable sampler or analog to digital converter 36 is provided; the A/D output may be e.g., a 10 bit digital word per sample, depending on the number of levels of each sample determined by the baud rate of transmission for a given data rate. Since greatest economics are achieved in a purely digital implementation, the A/D converter preferably is provided at the output of the low pass filter (LPF) 30, permitting use of a digitally implemented demodulator (multiplier) 32. Of interest is the fact that the sampling function of the A/D converter 36 produces distortions in the resulting digital output waveforms which are similar, regardless of the relative locations of the A/D converter 36 and multiplier 32.

The output of the equalizer 34 is supplied in bit pairs to the digital decision device 37 which defines, from the binary word supplied thereto, the closest one of the levels 0, ±2, ±4, and ±6, and provides that level as an output to the partial response decoder 38. Partial response decoder 38 provides ±1 and ±3 outputs to the derandomizer 40 which in turn supplies ±1 and ±3 outputs to the gray level decoder 42, the latter providing a serial train of digital 1's and 0's corresponding to the original digital data input.

A principle aspect of modem technology and design is the provision of means for correcting errors in the output data stream. Numerous techniques are practiced, and the elements shown in FIG. 6 for this purpose are illustrative only. Closely associated with the decision device 37 is an amplitude error sensor 44 which generally performs the function - later discussed as to the mathematics involved — of identifying the difference between the decision level output of device 37 and the effective voltage level made input thereto, thereby to determine the error in the receiving conditions. For example, the adaptive equalizer 34 may provide an output value of 1.92 or 1.98 on the basis of which a +2 output from the decision device is generated, the decision error being the difference therebetween or, in the first example, 0.08 (or 0.02 in the second example). This value is then used to adjust the tap gain settings in the adaptive equalizer 34 to reduce the error to 0. It is also used, when an error is detected on the decision, to help determine which bit was in error. U.S. Pat. Nos. 3,757,296 and 3,747,065 assigned to the common assignee herein teach digit error detection and correction systems.

An error corrector device 45 has two functions. One of these functions is to sense the presence of a different kind of error, and for this it must receive inputs from various stages of the system which need to provide information that can be used in determining the presence of this different kind of error. This different kind of error can be, but is not restricted to, a sequence of output digits provided by the level decoder 42 which is prohibited because of some intrinsic limitations associated with partial response encoding/decoding.

The second of these functions of the error corrector 45 is to take some action when the aforementioned different kinds of errors have been detected. Such action can be of many types and depends on the desired tradeoff between implementation complexity and performance. One option involves simply invalidating that particular portion of the output by "flaging" it with an error signal; another option involves automatic request for retransmission of the erroneously received portion of the data stream; still other options are possible.

In attempting to correct for distortions arising out of timing errors, the automatic adjustments of the tap gain settings of the automatically adaptive equalizer provide an indication of the timing error itself. If precise timing and phase is achieved, the equalizer settings (assuming a center cap output) comprise . . . 0, 0, 0, 1, 0, 0, 0, 0, . . . . If the equalizer settings differ from this, both an indication of the existence of error and the direction of error are provided by the equalizer tap gain settings. This indication of the timing error then may be used to control the sampling rate (time and phase) of the A to D converter 36. This typically is accomplished by adjusting the clocking rates supplied to a frequency divider which provides the data, sampled at the baud rate, to the A to D converter, the clocking rate being changed by adding or deleting a clock pulse. (See, e.g., U.S. Pat. No. 3,745,248.)

On early modem designs, ten seconds or more was employed for initial acquisition of phase, frequency and timing; a preamble of about 5 or 6 seconds was employed, the remaining portion of the ten seconds being used by the modem to pull itself together in coarse tracking operations. Thereafter, the modem was ready to receive data and fine tracking proceeded as to all of frequency, phase and timing. Improved versions of coarse carrier phase and coarse timing controls are disclosed in U.S. Pat. Nos. 3,667,050 and 3,745,248; an improved form of fine timing control is taught in U.S. Pat. No. 3,697,689 - all assigned to the common assignee herein.

FIG. 7 illustrates a portion of the modem receiver of FIG. 6 employing a form of coarse phase and frequency control derived from a pilot signal transmitted with the data. The pilot signal is an undesirable technique, in view of the fact that it occupies a portion of the available bandwidth for transmission of data, hence reducing possible data transmission rates. Nevertheless, the transmitted pilot is effective for providing phase and frequency control and as seen in FIG. 7 is supplied to a phase-lock loop 46 which outputs the injection (demodulation) signal to the demodulator 32a. Such a system may also employ a preamble and, as illustrated, the A/D converter 47 converts the preamble and supplies the pulses to a preamble detector and timing response unit 48, the output of which is supplied to a first terminal of a switch 50, the other terminal of the switch 50 receiving an output from the adaptive equalizer 34'. The terminal of switch 50 connected to the preamble unit 48 is labelled "ACQ'N" (acquisition) and the terminal connected to the output of the equalizer 34' is labelled "TRACK". When a signal is initially received, all of the carrier frequency and phase, and timing control functions are coarse. The pilot signal initially provides frequency and phase control through the phase-lock loop 46 and the preamble, preceding the data transmission, through the units 47 and 48, provides timing control signals based on that preamble. These are supplied through switch 50 in its "ACQ'N" position for controlling the sample timing control circuit 52. In this embodiment, note that the A/D converter 36' is now located to receive the output of the demodulator 32a (in this instance an analog device). When initial acquisition is achieved, switch 50 automatically switches to the "TRACK" position. The timing control outputs of the equalizer than are supplied through the track terminal of switch 50 to control the timing of the sampling control circuit 52 and as well provide fine phase control for the phase-lock loop 46.

The system of FIG. 6 illustrates an improved system not requiring a pilot tone but employing a preamble of brief duration which is supplied from the input signal by the preamble circuit 54 to a phase-lock loop circuit 56, the latter supplying the demodulation (injection) signal to demodulator 32. The PLL 56 output also controls the sampling control circuit 52' in the initial acquisition by virtue of the switch 50'. When acquisition is accomplished, fine timing control then is derived from the output of adaptive equalizer 34 through the TRACK position of switch 50' for the sampling control circuit 52'. Phasing control for the phase-lock loop during tracking also is derived from the adaptive equalizer. If substantial distortions occur, the equalizer outputs are not adequate to provide the fine timing and phase control and, in the case of FIG. 7, the pilot tone resumes its coarse control function. In the case of FIG. 6, it is assumed that the system can adapt sufficiently despite extreme levels of distortion so as to permit the equalizer output to provide the phase and timing control at all times.

As before noted, digital implementation of the modem, to a maximum extent possible, is desirable and, in the case of the adaptive equalizer, is essential, for any practical design. It, moreover, should be appreciated that substantially the entirety of the transmitter and receiver (excepting those elements which directly supply the necessary analog signal to the transmission line or receive same at the receiver) may be implemented in digital fashion. Hence, any of the signal shapers or filters of the system may be digitally implemented. In the case of the receiver of FIG. 6, it will be apparent that the modulation function itself may be digital. Such digital systems employ stable clock sources, as indicated in FIG. 3 and FIG. 6 and suitable frequency divider chains for deriving the necessary clocking rates.

In the receiver of FIG. 6, the low pass filter 30 is intended as an analog device directly receiving the signal from the transmission line, and serves to remove certain frequency components not of interest in that signal introduced by distortions and interferences during transmission.

The analog signal, however, once subjected to sampling by the A/D converter 36, becomes "aliased", i.e., its spectrum is no longer composed of only the true signal spectrum, but instead an infinite number of "aliasing" spectrum components at higher frequencies are introduced. (This is well known from the mathematics of sampling.) Those "aliasing" spectral components must be filtered out before any further processing.

Accordingly, prior systems have provided the digital filter 33 which, as one of its principal functions, operates to "dealias" the converted digital signal. The filter 33, moreover, has the function of partially shaping the signal spectrum so that the desired time-domain response can be obtained; it will be recalled that part of this same function was performed by the filter at the transmitter.

FIG. 8 is a simplified illustration of such a filter or signal shaper. Digital samples at twice the baud rate are derived from the converter 36 and modulator 32 and supplied to the shift register 60. Shift register 60 has a number of stages n determined in accordance with the desired precision of the shaping and "dealiasing" functions. The samples, at twice the baud rate, are successively shifted through the stages by appropriate clocking means (not show). The labelling of the stages ($n-3/2$), ($n-1$) and ($n$) indicates the one-half baud interval spacing of the successive samples.

Each of the stages of shift register 60 has associated therewith a fixed multiplier (or divider) 62 (operated in common at the baud rate) to multiply the sample value in its corresponding stage before supplying it into the summing amplifier. The summed output, at the baud rate, from the summing amplifier 64 then is the signal sample of the desired response, both "dealiased" and shaped for the desired time-domain response. Specifically, as shown, it is necessary to approximately match the main part of the transmitted signal to the channel characteristics in order to obtain efficient transfer of signal power and maintain high effective signal-to-noise ratio at the receiver. This can be performed by filtration either at the transmitter or the receiver, or partly at both, with the filter characteristics of the transmitter and/or receiver determined in accordance with the signal transfer (i.e., filter) characteristics of the nominal transmission channel (assumed to be known and fixed).

Of course, the transmission channel characteristics vary with time and hence it is the purpose of the adaptive equalizer automatically to compensate for these variations in the transmission channel characteristics and thereby to reduce the combined effects of intersymbol interference and noise. The above-referenced U.S. Pat. No. 3,651,316 illustrates one such form of adaptive equalizer. The adaptive equalizer will be seen to include a number of shift register stages, determined in accordance with the equalization required. The baud rate samples from the filter are supplied to the shift register of the equalizer for further processing and, ultimately, producing the equalized samples on which decisions are made for deriving the final output digital data.

The present invention resides, in part, on the somewhat subtle observation that the cascaded configuration of a digital filter followed by an equalizer is wasteful and that, in fact, a digital filter, modified to include adjustable tap gains (i.e., multipliers with adjustable gains rather than the fixed, weighting resistors of the standard digital filter) can also perform the function of the adaptive equalizer. To accomplish this result, an appropriate algorithm for the tap-adjustment is necessary, as herein detailed. By the elimination of the separate equalizer, a system in accordance with the invention affords a significant reduction in implementation - complexity and cost, as well as improved performance in terms of SNR (i.e., signal-to-noise ratio). Moreover, phase and timing tracking are significantly improved since the absolute delay between the points of error-sensing and error-correcting is reduced by an amount corresponding to the length of the eliminated equalizer. This latter point may be readily appreciated with reference to FIG. 8 and FIG. 6 wherein, since the adaptive equalizer 34 again constitutes a succession of shift register stages, it will be appreciated that a significant delay exists between the sensing of the error at the analog-to-digital converter (sampler) 36 which precedes the digital filter 33 in the signal flow path. It is significant that the delay between the sensing and the correcting of errors determines the highest speed at which errors can be corrected, and hence the highest rate at which the channel can change characteristics and still be tracked by the modem receiver.

SUMMARY OF THE INVENTION

Accordingly, it is an object of this invention to simplify the design and implementation of modems.

A further object of the invention is to improve the performance of modems through reduction of the necessary number of delay-and-add stages, without increasing cost or complexity.

Moreover, it is an object of this invention to both simplify the design of modem receivers and to improve performance, through the provision of an adjustable digital filter combining the functions of the conventional, separate digital filter and adaptive equalizer as heretobefore provided.

The invention arises out of the rather subtle observation that the provision of two cascaded systems of "delay-and-add" stages are unnecessary and indeed wasteful and that instead an adjustable digital filter can be operated by a suitable algorithm to accomplish the joint functions of the conventional, separate prior art filter and equalizer.

This accomplishes both simplification and reduced cost of a modem receiver and also improves performance over prior art systems. Generally stated, the number of stages of delay required by two separate filter and equalizer units imposes an increased time delay between the detection of errors in the received data and the correction of the data stream based on the detected errors. Reducing the number of states reduces that delay time and hence improves performance, in that the modem receiver can track time-varying channels where characteristics change faster than could be tracked with prior art systems.

The general algorithm by which this is accomplished may be stated as follows:

$$0 = E/j\{e(j) \cdot x(j+i)\}, i = 0, 1, 2, \ldots (2N-1)$$

where $e(j) = \hat{y}(j) - y(j)$, is the error between the true output and the estimated output.

i.e. $y(j)$ = true undistorted output corresponding to the distorted input $x(j)$ $$\text{and } \hat{y}(j) = \sum_{k=0}^{2N-1} g(k) \cdot x(j+k)$$

where $g(k)$ is the $k^{th}$ tap gain setting.

This equation indicates which tap ($i$) to adjust and by how much in order to minimize the mean square error for a given sample ($j$). It comprises a set of 2N simultaneous linear equations. In a more directly implementable manner, this equation may be reduced to a known incremental adjustment algorithm:

$$\Delta g_i = K \cdot \{\text{Sgn}(Y_j) \cdot \text{Sgn}(X_{j+i})\}, K = \text{constant}$$

A form of semi-proportional control may be accomplished in accordance with:

$$\Delta g_i = L \cdot \{Y_j \cdot \text{Sgn}(x_{j+i})\}, L = \text{constant}$$

In each of the above equations, $Y_j$ is the error arising out of digit decisions compared to the estimate of those digit decisions. The $\Delta g$ function is the gain adjustment necessary for a given tap position ($i$); ($x_{j+i}$) is the signal sample with respect to the tap ($i$), and $x_j$ is the sample currently being processed. It is to be noted that in the format employed in this description — $A(b) \triangleq A_b$.

As is known, digital filters must process both the integer baud samples as well as the half-baud samples to achieve proper dealiasing of the signal and as well to achieve proper wave shaping for further processing.

Control of the half-baud tap gains is shown through the derivation of appropriate algorithms to be directly accomplished as a function of the value of the integer baud gain settings. A simplified form of the algorithm requires that only the next adjacent integer baud gain setting be employed to adjust the half-baud position and specifically:

$$g[(i+\tfrac{1}{2})T]_{t=KT} \simeq g(iT)_{KT} \cdot [1+\tfrac{1}{2}+\tfrac{1}{8}] -$$
$$g(iT)_{(K-1)T} \cdot [\tfrac{1}{2}+\tfrac{1}{4}] + g(iT)_{(K-2)T} \cdot [\tfrac{1}{8}]$$

"Half Baud" tap gain setting where $i = 1, 2, 3, \ldots n$ = Function of "integer-baud" tap gain settings.

Improved results can be obtained where the successive integer-baud tap gain settings are employed to control the tap gain setting of the intermediate half-baud tap in accordance with the following algorithm:

$$g[(i+\tfrac{1}{2})T]_{t=KT} \simeq \tfrac{1}{2}\{g(iT)_{KT}[1+\tfrac{1}{2}+\tfrac{1}{8}] + g[(i+1)T]_{KT}[1-\tfrac{1}{2}+\tfrac{1}{8}] - g(iT)_{(K-1)T}[\tfrac{1}{2}+\tfrac{1}{4}] + g[(i+1)T]_{(K-1)T}[\tfrac{1}{2}-\tfrac{1}{4}] + g(iT)_{(K-2)T}[\tfrac{1}{8}] + g[(i+1)T]_{(K-2)T}[\tfrac{1}{8}]\}$$

This approach is advantageous since more accurate, but significantly, requires no more memory storage than the first method — rather, it makes more use of the available information necessary to the first method.

The above features of the invention will be more readily appreciated with reference to the following drawings and detailed description of the invention, in which:

BRIEF DESCRIPTION OF DRAWINGS

FIG. 4 is a waveform plot of a single transmitted pulse, transmitted with type IV partial response coding, as received at the receiver;

FIG. 5 is a waveform plot of three successive pulse transmissions with partial response coding, as received at the receiver and indicating overlapping of the successive waveforms;

DETAILED DESCRIPTION OF THE INVENTION

As set forth in the above discussion of the prior art, the design of digitally implemented modems conventionally has provided for a separate digital filter for shaping the signal spectrum of the sampled, received signal to achieve the desired time-domain response and, since preceded by a sampled-data demodulator, operates as a "dealising" filter. As developed more fully below, the digital filter must operate on both the one-half space baud samples and the integer-number spaced baud samples of the received signal (which, as noted, is sampled at twice the baud rate). This is essential for effective "dealising". On the other hand, the filter provides baud-rate samples to the equalizer and the latter operates at the baud rate. This latter aspect is logical within the conventional design concepts since the equalization necessary is only that for compensating for the contributions of error made by overlap of the pulse transmissions preceding and succeeding a given pulse currently to be evaluated from the received signal — i.e., a sample, at the (integer) baud rate. Again, it is to be appreciated from the illustrative waveform of FIG. 5 that the selected form of pulse coding - here, illustratively, the type IV partial response coding - produces for an ideal response, contributions to the amplitude sample at a given sample time (spaced at the baud interval) from only a current pulse being evaluated and a pulse transmitted two baud intervals earlier. All other waveforms reduced to zero amplitude at the sample time, if equalization has been achieved.

In the following, the problem presented in implementing a combined digital filter and equalizer is analyzed and a general solution presented, with a statement of the fundamental algorithm for adjusting tap gains of the combined elements, hereinafter referred to as the single "adaptive digital filter". Thereafter, the adjustment of the "half baud" taps is analyzed and two alternative algorithms set forth for the adjustment of those taps. The adjustment of the "integer baud" taps then is explained and the algorithm set forth. Further, the performance of the adaptive digital filter is analyzed, followed by a discussion of autocorrelation considerations. The Appendix to this description is a discussion of the ergodicity of the autocorrelation.

Finally, a practical implementation of the adaptive digital filter is disclosed and discussed.

Analysis of the Problem

The digital filter and the equalizer of a conventional system have equivalent transfer functions, which may be expressed, respectively, as:

$H_1(j\omega)$ and $H_2(j\omega)$

Accordingly, a combined filter and equalizer of the type here under consideration, must have a transfer function which may be expressed as:

$$H_3(j\omega) \triangleq H_1(j\omega) \cdot H_2(j\omega)$$

Intuitively, $H_3(j\omega)$ is most likely going to be somewhat more complicated than either $H_1(j\omega)$ or $H_2(j\omega)$ alone.

Figure 9A:
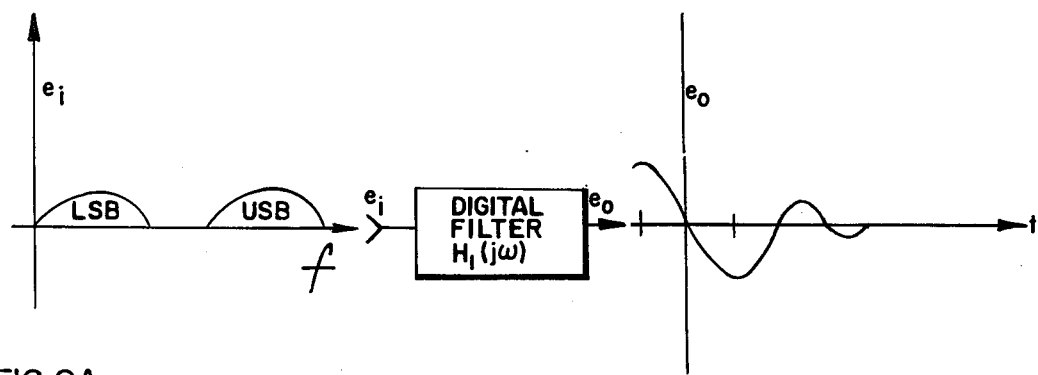
FIGS. 9A and 9B are illustrative block diagrams of digital filters and associated waveform plots of input and output signals, for purposes of explaining requirements of the adjustable filter of the invention.

With reference to FIG. 9A, the digital filter is so designed ($H_1(j\omega)$) that the spectrum pictured as its input signal $e_i$ (which is the unfiltered output of the demodulator 32 in FIG. 6) results ideally in an output signal $e_o$ having the ideal time-domain response shown at the output of the filter. This corresponds to the situation when the equalizer has a single tap equal to unity, and all others equal to zero.

Figure 9B:
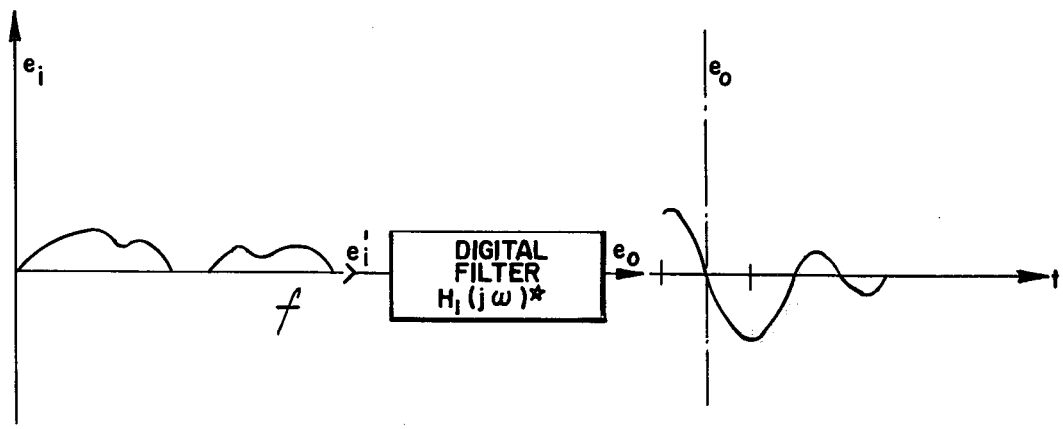

Now suppose as in FIG. 9B that the spectrum of the signal input $e'_i$ to the filter is distorted due to channel disturbances. Certainly there exists a setting of the taps of the digital filter ($H_1(j\omega)^*$) such that the output $e'_o$ of that filter results in the same ideal response without the need of any equalizer.

The problem is, therefore, to develop the algorithm which will drive the adjustable filter taps to that setting which will result in an ideal output.

Figure 1:
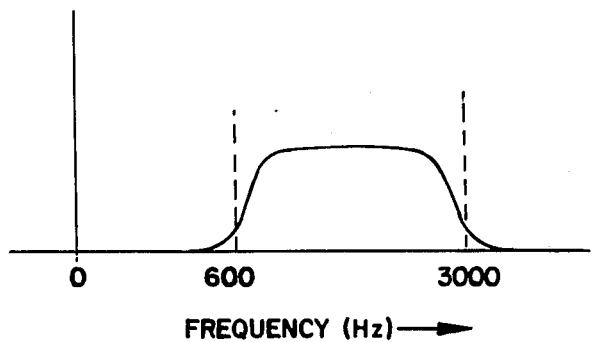
FIG. 1 is a waveform illustrating the conventional telephone line transmission characteristics.
Figure 2A:
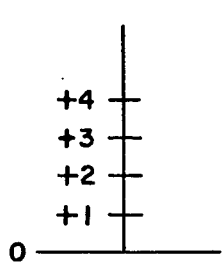
FIGS. 2a, 2b and 2c represent, respectively, the conversion of two-level to four-level digital data, partial balancing of the four-level data and completely symmetrical balancing of the four-level data.
Figure 2B:
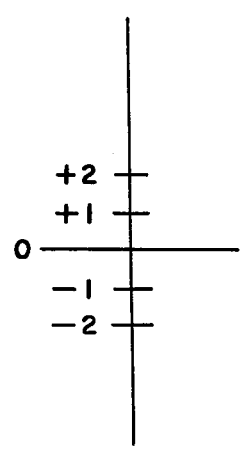
Figure 2C:
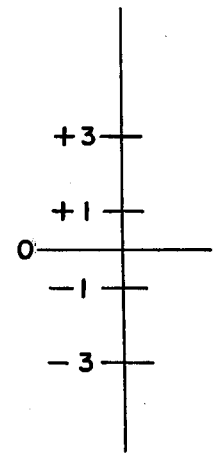
Figure 3:
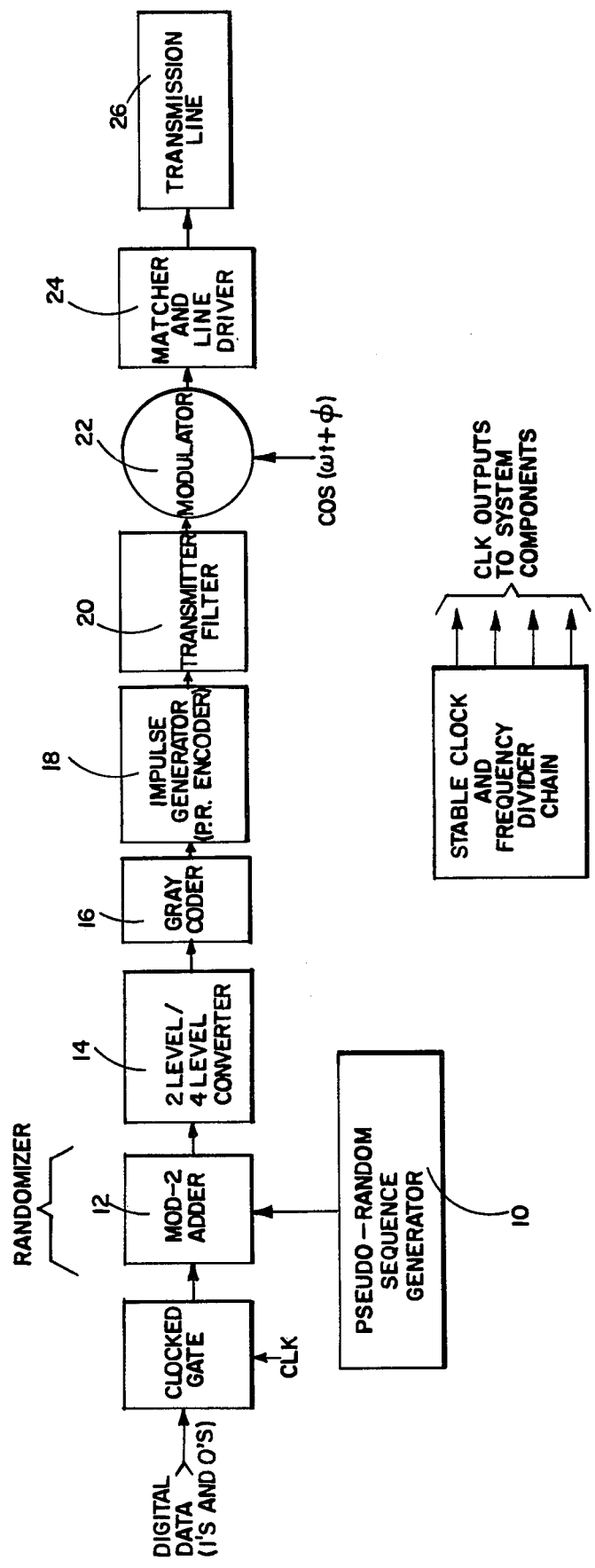
FIG. 3 is a block diagram of a conventional (prior art) digital data transmission system.
Figure 6:
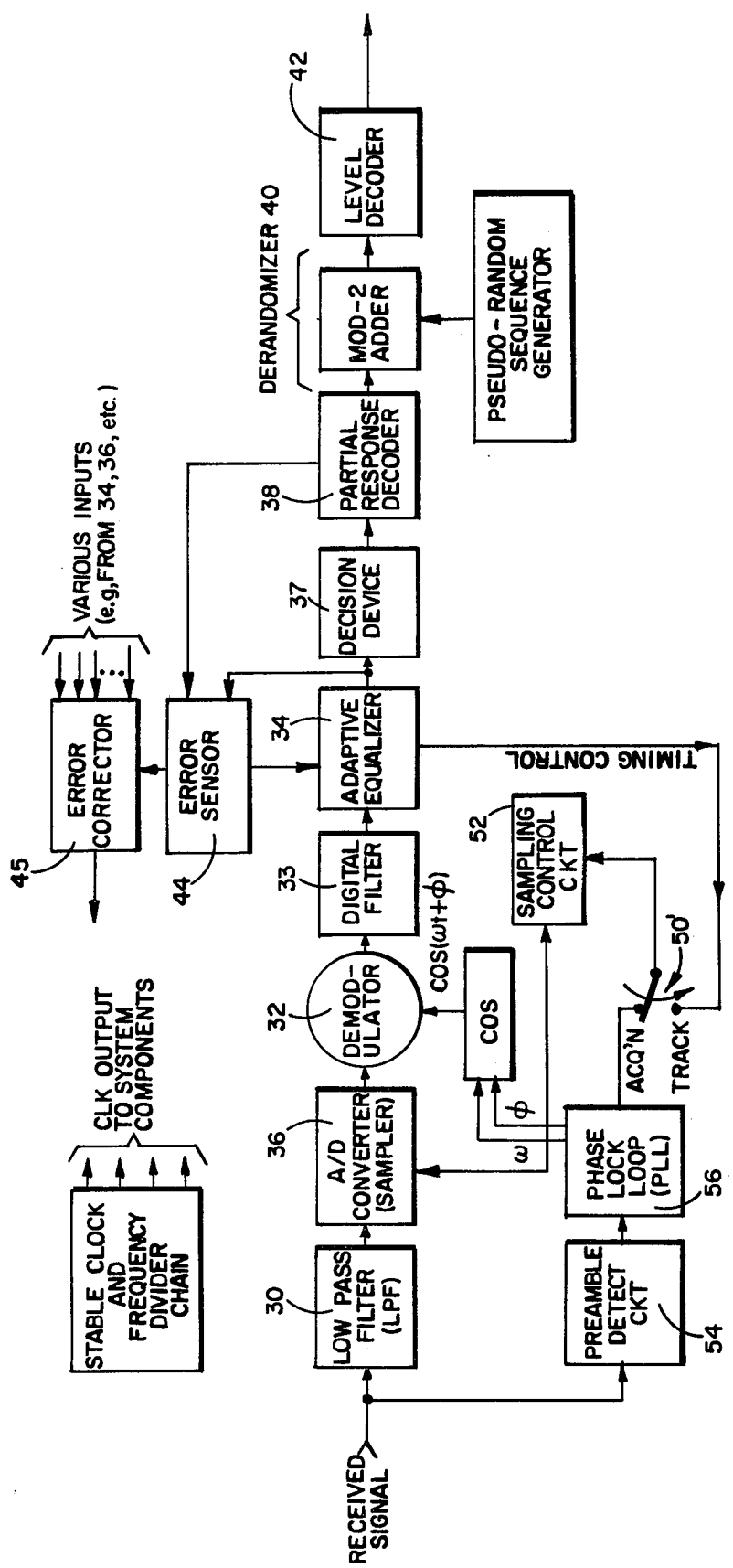
FIG. 6 is a block diagram of a conventional (prior art) digital data receiving system.
Figure 7:
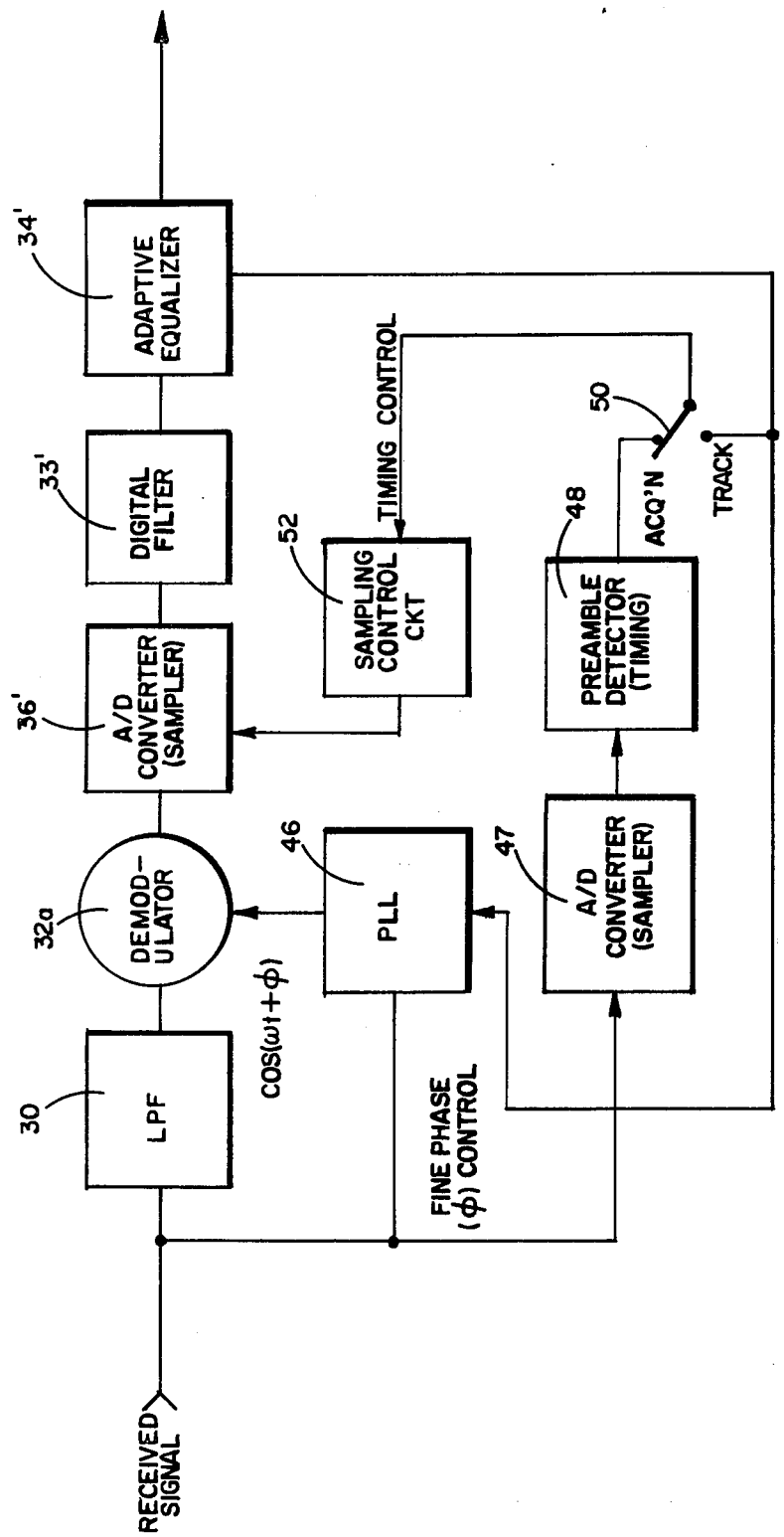
FIG. 7 is a block diagram of a conventional (prior art) alternative form of a digital data receiving system.
Figure 10:
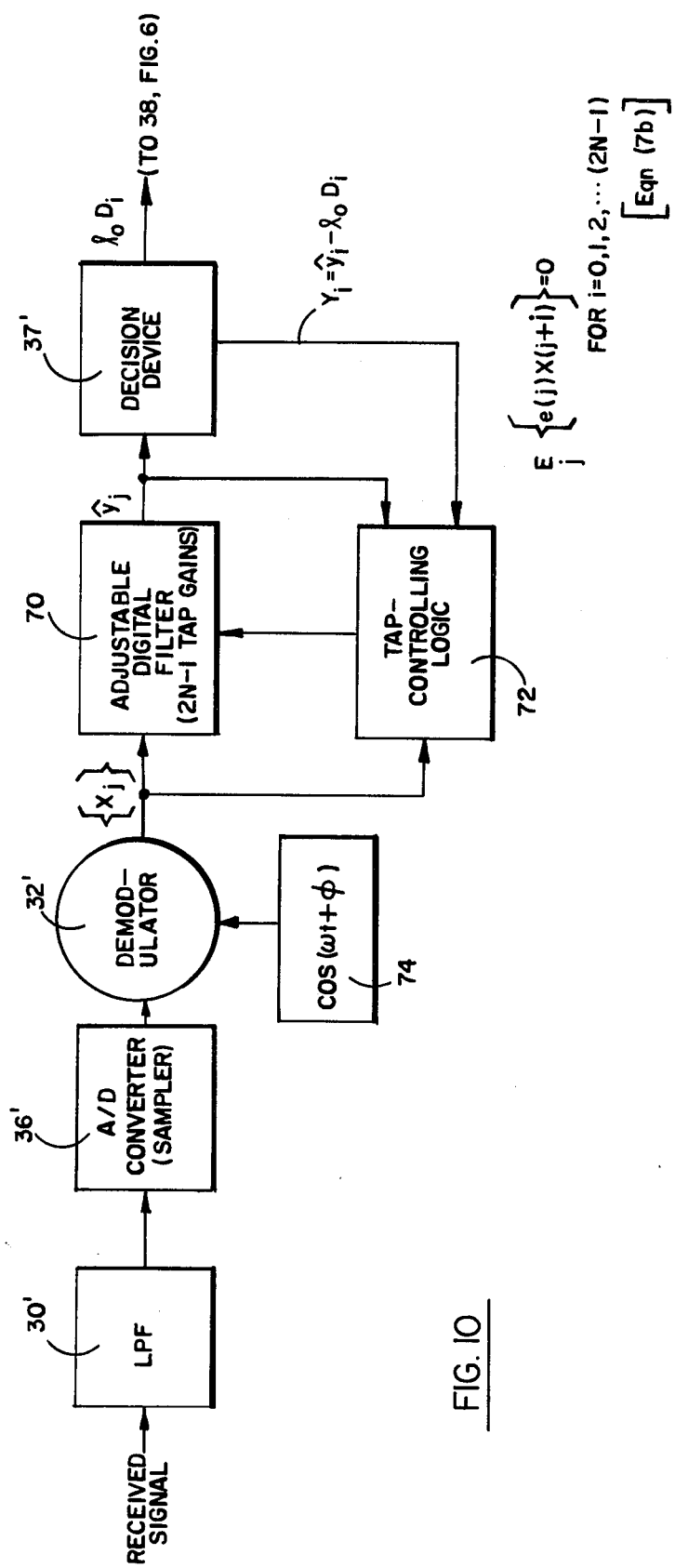
FIG. 10 is a general block diagram of a digital data receiving system utilizing an adjustable digital filter in accordance with the invention.

For convenience of discussion, consider now the simplified block diagram of FIG. 10 illustrating a system having the adjustable digital filter of the invention. Elements common to those of FIG. 6 are labeled by identical, but primed numerals corresponding to those of FIG. 6. The adjustable digital filter is shown at 70 and the tap controlling logic therefor at 72. Oscillator 74 provides the injection (demodulation) signal $\cos(\omega+\phi)$ to the demodulator 32' for obvious purposes, as above discussed.

The incoming signal is sampled at the receiver at twice the baud rate and digital demodulation is done at that same rate.

From aliasing considerations, $$S_A(f_r) = S(f_r) + \sum_{q=1}^{\infty}\left[S\left(\frac{q}{\Delta\tau}-f_r\right) + S\left(\frac{q}{\Delta\tau}+f_r\right)\right] \quad (1)$$

where
$S_A(f_r)$ = Aliased spectral density at frequency
$S(f_r)$ = True non-aliased spectral density at same frequency
$\Delta\tau$ = Sampling interval.

The bandlimited signal used is the type IV partial response one, namely.

$$x(t) = \frac{-2T^2}{\pi}\sum_i a_i \sin\left[(t-iT)\frac{\pi}{T}\right] \cdot \frac{1}{T^2-(t-iT)^2} \quad (2)$$

where $$P\left(a_i = k\right) = \begin{cases} \frac{1}{4}, k = \pm 1, \pm 3 \text{ (for 4-level signalling)} \\ 0; \text{ elsewhere} \end{cases}$$

For $T = 1/4800$ sec, the amplitude spectrum of this signal is $$\chi(f) = [\text{sm}(2\pi fT)] \cdot U(f-(1/2\tau)) \quad (3)$$

where $U(f)$ is the Heaviside unit step function, defined to be unity for positive values of the argument, and zero for negative values of the argument.

From Equation (1) is follows that, assuming that the baseband signal is transmitted unheterodyned, the frequency separation between the true spectrum and its first alias will be:

$$9600 - 2(2400) = 4800 \text{ Hz}$$

If the baseband signal is heterodyned at the transmitter (as it actually is) and made to occupy the frequency region 500 Hz $\leq f \leq$ 2900 Hz, the frequency separation is only 3800 Hz. Clearly, if the received signal was sampled at the baud rate, the spectral aliases would overlap with the true signal spectrum, thereby making filtering not a feasible task.

Since information is conveyed — for partial response signaling — at baud intervals, the equalizer uses only baud-spaced samples and discards the in between ones. The problem, therefore, is how to optimally combine two functions: the digital filtering utilizing half-baud spaced samples, and the equalizer utilizing baud-spaced samples, and to do so without degrading either of the two functions.

Recall, specifically that the functions of the adjustable digital filter are to:

a. "Dealias" and filter out the undesired sideband from the demodulator's output;
b. Partially shape the spectrum of the remaining sideband so that its inverse Fourier transform results in the ideal impulse response; in the case of the type IV partial response scheme here contemplated, that ideal impulse response 0, 0, 0, 1, 0, −1, 0, 0, 0 response; and
c. perform the equalizer's job as well.

Figure 8:
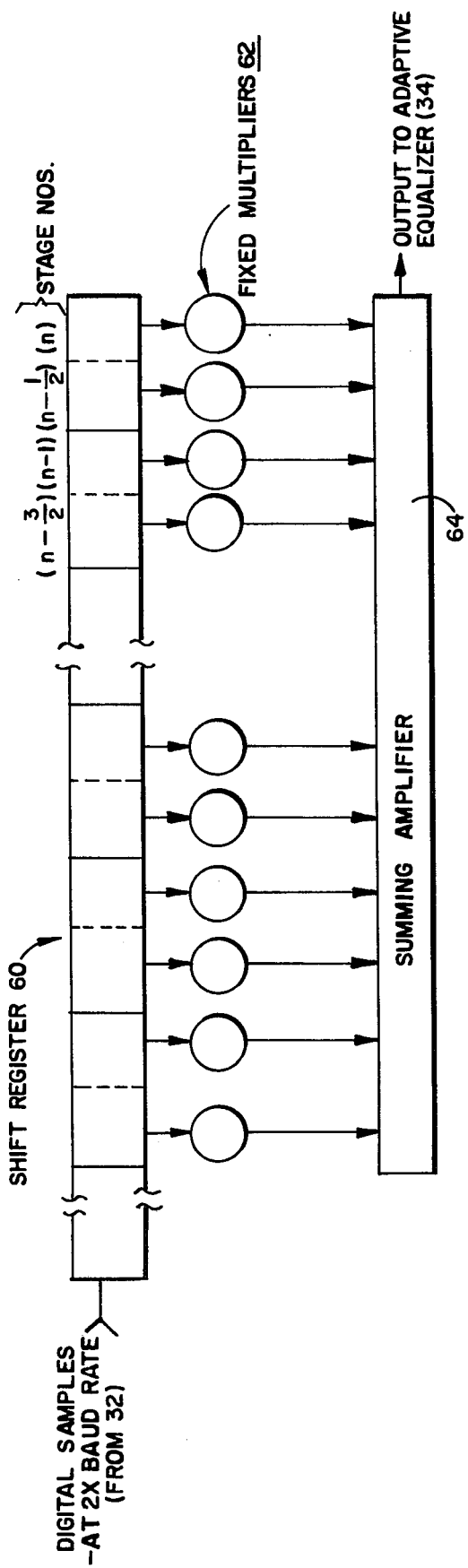
FIG. 8 is a block diagram of a conventional (prior art) digital filter.

(A conventional digital filter as illustrated in FIG. 8, in actual use at the present time includes a shift register 60 having 60 stages, and thus 60 taps spaced ½ baud apart. Fixed multipliers 62 multiply the sampled outputs of the taps by predetermined constants, and the products are supplied to a summing amplifier 64 which provides the filtered output as samples at the baud rate to the equalizer. There are an additional 20 to 25 taps for the equalizer in the typical system, such as illustrated in FIG. 6. The adjustable digital filter of the invention need not extend the number of taps of the prior filter, yet eliminates those of the prior, separate equalizer.)

General Solution: Fundamental Algorithm

Let $E\{\}$ denote the statistical expectation operator, $y(j)$ be the output of the combined filter-equalizer, $x(j)$ be the corresponding input, and $g(k)$ be the tap gains; it is understood that taps are spaced ½ baud apart. (From FIG. 8, it is apparent that there are $n$ integer number baud taps and $(n-1)$ in-between, or half-baud taps.)
Then $$\hat{y}(j) = \sum_{k=0}^{2N-1} g(k) \cdot x(j+k) \quad (4)$$

If $y(j)$ denotes the true, undistorted, value of the ideal output for a given signal sample $(j)$, then let $$e(j) \triangleq \hat{y}(j) - y(j) = \left[\sum_{k=0}^{2N-1} g(k) \cdot x(j+k)\right] - y(j) \quad (5)$$

and the analytically convenient mean square error is, consequently $$E[e^2(j)] = \{E[\hat{y}(j)-y(j)]^2\}$$

No distinction will be made for the time being between integer-baud-spaced taps and half-baud-spaced taps.

Minimizing (6) and substituting (5) in it is accomplished by setting the first partial derivatives to zero (with respect to all taps, half-baud and integer-baud-spaced ones alike).
Then $$0 = \frac{\delta}{\delta g(i)} E[e^2(j)] =$$

$$E\left\{2[\hat{y}(j) - y(j)] \cdot \left[\frac{\delta}{\delta g(i)} \sum_{k=0}^{2N-1} g(k) \cdot x(j+k)\right]\right\}$$

or $$0 = E_j\left\{e(j)x(j+i)\right\},$$

$$i = 0, 1, 2, \ldots (2N-1) \qquad (7)$$

This is the fundamental result which indicates which tap (i) to adjust and by how much in order to minimize the mean square error for a given sample (j). It is a set of 2N simultaneous linear equations.

Adjustment of the "Half Baud" Taps

Simplifying the digital implementation is not straightforward. The reason is that wherein:

$I_oD_j=$ decision estimate of $y_j$, or $\hat{y}_j$ (i.e., the decision based on the equalizer output $\hat{y}_j$, and $y_j$ being the ideal output) can replace the unknown quantity $y(j)$ in Equation (7) shown at integer-baud-spaced intervals, no decision is made at the inbetween, half-baud intervals; nothing, thus, can replace the unknown $y(j)$ in that same Equation (7) for these $\{j\}$.

One obvious approximation is to leave the "half-baud" taps intact in the combined filter-equalizer and to vary only the baud-spaced ones. This approximation, it has been pointed out, is of questionable validity because it may interfere with one basic function of the digital filter-portion of the unit which is to filter out the aliasing spectra. A rigorous proof is not presented, since it is clear that this approximation is less than optimum, and not even acceptable.

The solution is to derive information for adjusting these "half-baud" taps from the adjustments made to the "integer-baud" taps.

It can be assumed with no loss of generality that all the signal shaping is done at the receiver. The digital filter, then, using conventional Z-transform notation, is:

$$H(z) = \sum_{i=0}^{2N-1} g_i z^{-i} \qquad (8)$$

and will have as its coefficients the values of the ideal impulse response at half-baud intervals; the ideal response is readily obtainable as the inverse Fourier transform of Equation (3) shifted by 90° in phase, i.e., $$F^{-1}\left[\sin(2\pi fT)e^{j\pi/2}U\left(f - \frac{1}{2T}\right)\right] =$$

$$\left[\sin\left(\frac{t\pi}{T}\right)\right] \cdot \frac{(k = \text{const.})}{T^2 - t^2} \qquad (9)$$

If part only of the signal shaping is done at the receiver, the same approach still is applicable, with the understanding that the digital filter's coefficients will have the values of the inverse transform of whatever frequency-domain representation is expected of the filter.

Two different aglorithms are developed below for adjusting these "half-baud" taps, based on the adjustments made to the "integer-baud" taps which, in turn, are adjusted basically according to Equation (7).

First Half-Baud Tap Adjustment Algorithm

At the $i^{th}$ "integer-baud" tap, the digital filter coefficient must have the value of the ideal impulse response corresponding to the $i^{th}$. If we Taylor-expand the ideal impulse response given by Equation (9) around $$t = iT$$

then, the value of that function around $t = iT$ will be given by $$f(iT + \Delta t) =$$

$$f(iT) + (\Delta t)f'(iT) + \frac{(\Delta t)^2}{2!}f''(iT) + \frac{(\Delta t)^3}{3!}f'''(iT) + \ldots \qquad (10)$$

As time goes on and that particular tap is adjusted automatically according to Equation (7), the value of that tap will really be $$f(iT)_t$$

where the subscript "t" indicates the time dependence of the quantity $f(iT)$. If, in addition to that information, we had information on $$f'(iT)_t, f''(iT)_t, f'''(iT)_t, \text{ etc.}$$

Then, setting
$$\Delta t = T/2$$

in Equation (10) would yield the optimal setting of the tap spaced one-half baud to the right of this $i^{th}$ tap. In fact, we do have a good measure of such information. For example, at $t = kT$, the quantity $f'(iT)$ is, to an approximation, $$f'(iT)_{kT} \approx (1/T) [f(iT)_{kT} - f(iT)_{(k-1)T}] \qquad (11)$$

Similarly, at $t = kT$, the quantity $f''(iT)$ is, to an approximation $$f''(iT)_{kT} \approx (1/T) [f'(iT)_{kT} - f'(iT)_{(k-1)T}] \approx$$
$$(1/T^2)[f(iT)_{kT} - f(iT)_{(k-1)T} - f(iT)_{(k-1)T} + f(iT)_{(k-2)T}] \text{ or, } f''(iT)_{kT} \approx (1/T^2)[f(iT)_{kT} - 2f(iT)_{(k-1)T} + f(iT)_{(k-2)T}] \qquad (12)$$

Substituting (11) and (12) into (10) gives, for $\Delta t = T/2$, the following:

"Half-baud" tap gain $g_j$ at time $kT$ is $= f(iT+T/2)_{kT}$ where:

$$f(iT + T/2)_{kT} \approx f(iT)_{kT} + \frac{T}{2} \cdot \frac{1}{T} [f(iT)_{kT} - f(iT)_{(k-1)T}] +$$

$$\left(\frac{T}{2}\right)^2 \cdot \frac{1}{2!} \cdot \frac{1}{T^2} [f(iT)_{kT} - 2f(iT)_{(k-1)T} + f(iT)_{(k-2)T}]$$

or, simplifying and combining, this becomes $(g_j)_{t=KT} \approx f(iT)_{KT}[1+½+⅛] - f(iT)_{(K-1)T}[½+¼]+f(iT)_{(K-2)T}[⅛]$ or, in terms of taps' gains, for a given signal sample (j)

$(g_j)_{t=KT} \approx f(iT)_{KT}[1 + ½ + ⅛] -$
$f(iT)_{(K-1)T}[½ + ¼] + f(iT)_{(K-2)T}[⅛]$ or, in terms of taps' gains, for a given signal sample (j)

$g[(i + ½)T]_{t=KT} \simeq g(iT)_{KT} \cdot [1 + ½ + ⅛] -$
$g(iT)_{(K-1)T} \cdot [½ + ¼] + g(iT)_{(K-2)T} \cdot [⅛]$ "Half Baud" tap gain = Function of "integer-baud"
setting where $i = 1, 2, 3, \ldots n$, tap gain settings. (13)

This is a readily usable result. It states quite clearly given the past few values of an "integer baud" tap (i.e., (iT)), a simple linear operation produces a good algorithm as to how to handle the "half-band" tap (i.e., $(i+½)T$) next to that "integer baud" tap for optimal combined filtering and equalization.

The degree of accuracy can be furthher improved simply by not limiting ourselves to only the three first additive terms of Equation (10), but by taking five or six terms instead.

Second Half-Baud Tap Adjustment Algorithm

This is an improved version of the first method above. The algorithm involves utilizing information from two adjacent taps rather than just one. The idea is to Taylor-expand around both "integer-baud" taps either side of the half-baud tap; i.e., we Taylor-expand the ideal impulse-response given by Equation (9) about $t = iT$ and $t = (i + 1)T$ We thus have:

$$f(iT + \Delta t) = f(iT) + (\Delta t)f'(iT) + \frac{(\Delta t)^2}{2!}f''(iT) + \ldots \quad (14)$$

$$f[(i + 1)T + \Delta t] =$$
$$f[(i + 1)T] + (\Delta t)f'[(i + 1)T] + \frac{(\Delta t)^2}{2!}f''[(i + 1)T] + \ldots \quad (15)$$

Letting
$\Delta t = +T/2$ in (14) above
$\Delta t = -T/2$ in (15) above
yields two independent estimates of the impulse response at the inbetween "half-baud" instance, namely:

$$f(iT + T/2) = f(iT) + \frac{T}{2}f'(iT) + \frac{T^2}{8}f''(iT) + \ldots \quad (14b)$$

$$f(iT + T/2) =$$
$$f[(i + 1)T] - \frac{T}{2}f'[(i + 1)T] + \frac{T^2}{8}f''[(i + 1)T] + \ldots \quad (15b)$$

A "good guess" at the proper gain setting is the average of these two estimates, namely:

$f(iT + T/2) \approx$ $½ \left\{ f(iT) + f[(i + 1)T] + \frac{T}{2}f'(iT) - \frac{T}{2}f'[(i + 1)T] + \right.$ -continued $$\left. \frac{T^2}{8}f''(iT) + \frac{T^2}{8}f''[(i + 1)T] \right\} \quad (16)$$

Using an argument identical to the one which led Equations (11) and (12) above, we have:

$f'(iT)_{KT} \approx (1/T) [f(iT)_{KT} - f(iT)_{(K-1)}T]$ (17a)
$f''(iT)_{KT} \approx (1/T^2) [f(iT)_{KT} - 2f(iT)_{(K-1)}T + f(iT)_{(K-2)T}]$ (17b)
$f'[(i+1)T] \approx (1/T) \{f[(i+1)T]_{KT} - f[(i+1)T]_{(K-1)T}\}$ (17c)
$f''[(i+1)T] \approx (1/T^2) \{f[(i+1)T]_{KT} - 2f[(i+1)T]_{(K-1)T} + f[(i+1)T]_{(K-2)T}\}$ (17d)

Substituting (17a), (17b), (17c), (17d) into (16) above, we have: "Half-baud" tap gain $g_j$ at time $kT$ is = $f(iT + T/2)$ of Equation (16) above, where: i.e, $g[(i+½)T]_{t=KT} \approx ½ \{ g(iT)_{KT} + g[(i+1)T]_{KT} + ½g(iT)_{(K-1)T} - ½g(iT)_{(K-1)T} - ½_{(K-1)T}[(i+1)T]_{KT} + ½g[(i+1)T]_{(K-1)T} + ⅛g(iT)_{KT} - ¼g(iT)_{(K-1)T} + ⅛g(iT)_{(K-2)T} + ⅛g[(i+1)T]_{KT} - ¼g[(i+1)T]_{(K-1)T} + ⅛g[(i+1)T]_{(K-2)T}\}$ or, combining like terms, this reduces to $g[(i+½)T]_{t=kt} \approx ½ \{g(iT)_{kt} \cdot [1+½+⅛] + g[(i+1)T]_{kt} \cdot [1-½+⅛] - g(iT)_{(K-1)T} \cdot [½+¼] + g[(i+1)T]_{(K-1)T} \cdot [½-¼] + g(iT)_{(K-2)T} \cdot [⅛] + g[(i+1)T]_{(K-2)T} \cdot [⅛]\}$ (18)

which is a generalized version of Equation (13) earlier.

A further extension of the deviation leading to Equation (18), with respect to additional prior time intervals, yields:

$g[(i+½)T]_{t=KT} = ½ \cdot \{g(iT)_{KT} \cdot [1+½+⅛] + g[(i+1)T]_{KT} \cdot [1-½+⅛] - g(iT)_{(K-1)T} \cdot [½+¼] + g[(i+1)T]_{(K-1)} \cdot [½-¼] + g(iT)_{(K-2)T} \cdot [⅛] + g[(i+1)T]_{(K-2)T} \cdot [⅛] - g(iT)_{(K-3)T} \cdot [1/48] + g[(i+1)T]_{(K-3)T} \cdot [1/48] + g(iT)_{(K-4)T} \cdot [1/384] + g[(i+1)T]_{(K-4)T} \cdot [1/384] + \ldots\}$ (18a)

In Equation (18a), it is seen that the terms corresponding to those of Equation (18) have the identical multiplicative constants. It also follows, in view of the relatively much smaller contributions of the tap gain settings for prior time intervals, that satisfactory results are obtained by using only immediately adjacent integer tap gains for a current time interval, or:

$g[(i+½)T]_{t=KT} = ½ \cdot \{g(iT)_{KT} [13/8] + g[(i+1)T]_{KT} \cdot [⅝]\}$ (18b)

If one is unwilling to go to the trouble of using 3 terms in the Taylor-series and uses only one term per Taylor-series instead, this reduces to the intuitively obvious result:

$g[(i+½)T] \approx ½ \cdot \{g(iT)_{KT} + g[(i+1)T]_{Kt}\}$ (18c)

which is a rather gross approximation. In general, and at least theoretically, the fewer the number of terms used, or the less accurate the multiplication constants, the longer is the time required for the system to adapt, i.e., converge. Hence, the function of Equation (18c), while simplistic and useable, is not preferred.

As noted, any of Equations (18) to (18c) may be interpreted as relating to actual tap gain values or to the adjustments to those values, mathematically expressed by substituting for each "g" term therein the term "$\Delta g$".

The advantage of this second method over the first method is that it requires no more memory storage for the few past values of the tap gains than the first method; it does, however, make more use of the available information.

Adjustment of the "Integer Baud" Taps

The "integer baud" taps' adjustments (on which the adjustments of the "half baud" taps is based as explained at length above) is carried out in a straightforward manner according to the optimal solution of Equation (7) repeated below $$0 = E_j \{ e(j) \, x(j+i) \} \quad (7),$$

$i$ = index of "integer-baud" taps where, repeating equation (5):

$$e(j) \triangleq y(j) - \hat{y}(j) \quad (5)$$

Letting $y(j) \approx l_o D_j$
where
- $l_o$ is the gain factor of the decision device and
- $D_j$ is the decision corresponding to the estimated $\hat{y}(j)$, and
- $y(j)$ is the true instantaneous ideal sample value; and defining $$Y(j) \triangleq Y_j \triangleq l_o D_j - \hat{y}(j), \, x(j+i) \triangleq x_{j+i}$$

Equation 7 becomes $$E_j \{ Y_j \, x_{j+i} \} = 0, \quad (7b)$$

where $i$ = index of "integer baud" taps.

It is significant that the solution (7b) above is independent of the autocorrelation of the signaling scheme used; the autocorrelation may or may not be zero at various "half-baud" and/or "integer" baud displacements from zero. This particular topic is treated in detail in a later section.

In terms of implementation, Equation (7b) can be implemented as is, or it can be simplified somewhat to $$e_j \{ Y_j \cdot \text{sgn}(x_{j+i}) \} = 0 \quad (7c)$$

which is a form of a semi-proportional control. A still further simplified version of it is the incremental adjustment technique taught in U.S. Pat. Nos. 3,651,316 and 3,699,321, namely, $$\Delta g_i = K \cdot \{ \text{sgn}(Y_j) \cdot \text{sgn}(x_{j+i}) \}, \, K = \text{constant}. \quad (7d)$$

i.e., the $i^{th}$ tap is changed by a constant small increment whose sign is determined by the product of the signs of the relevant controlling quantities ($y_j$) and ($x_{j+i}$).

Variations of the fundamental equation (7b) can include using semiproportional control (7c) for a fixed short time followed by a constant-increments control of the type shown in Equation (7d), or it may include semiproportional-control increments of the type $$\Delta g_i = L \cdot \{ Y_j \cdot \text{sgn}(x_{j+i}) \}, \, L = \text{constant} \quad (7e)$$

or any of the many minor variations of Equation (7b) possible.

Performance Considerations

A measure of the performance of the algorithms given above for the combined digital filter and adaptive equalizer can be obtained by observing how the mean square error $$E_j [e^2(j)]$$

depends on tap value errors.

Let $g(k); k = 0, 1, 2, \ldots (2N-1)$ be the actual values of the taps and let $g_I(k); k = 0, 1, 2, \ldots (2N-1)$ be the ideal tap values.

If the taps are in error, the mean swuare error, then, is $$E_j \{ [e^2(j)] \} = E_j \{ [\hat{y}(j) - y(j)]^2 \}$$

$$= E_j \left\{ \left[ \sum_{k=o}^{2N-1} g(k) x(j+k) - y(j) \right]^2 \right\}$$

$$= E_j \left\{ \left[ \sum_{k=o}^{2N-1} g(k) x(j+k) - \sum_{l=1}^{2N-1} g_I(l) x(j+l) \right]^2 \right\}$$

Expanding the quadratic and multiplying the finite series, we obtain $$E_j [e^2(j)] = E_j \left\{ \sum_{k=o}^{2N-1} \sum_{m=o}^{2N-1} [g(k)g(m) x(j+k) x(j+m)] \right.$$
$$+ \sum_{l=o}^{2N-1} \sum_{n=o}^{2N-1} [g_I(l)g_I(m) x(j+l) x(j+n)]$$
$$\left. - \sum_{k=o}^{2N-1} \sum_{l=o}^{2N-1} [g(k)g_I(l) x(j+k) x(j+l)] \right\}$$
$$+ E [e_o^2(j)] \quad (20)$$

where $e_o(j)$ is the error if all tap values were perfectly correct.

Define the tap's error as:

$$\tau(k) \triangleq g(k) - g_I(k) \quad (20)$$

With the help of Equation (20), Equation (19) can be put in the more convenient form below:

$$E_j [e^2(j)] = E_j [e_o^2(j)] + \sum_{k=o}^{(2N-1)} \sum_{l=o}^{(2N-1)} \tau(k) \tau(l) E_j [x(j+k) x(j+l)]$$

$$(21)$$

It is significant that the means square error is a quadratic function of the tap gain errors. Furthermore, the autocorrelation of the signaling scheme, namely $$R(l-k) = E[x(j+k) x(j+l)] \quad (22)$$

acts as a weighting factor in Equation (21) above. The autocorrelation of the signaling scheme used will be considered next.

Autocorrelation of the Ideal Type – IV Partial Response Signal

The time-domain ideal pulse for $\phi = 90°$ is, within a constant multiplier, $$-\frac{2T^2}{\pi} \sin\left(\frac{t\pi}{T}\right)\left[\frac{1}{T^2 - t^2}\right] \quad (23)$$

For a string of pulses spaced 1 baud apart and having "weights" $a_i = \pm 1, \pm 3$ drawn from a uniform discrete probability distribution $P(a_i)$, where $$(24)$$

$$P\{a_i = k\} = \left\{\begin{array}{l} \frac{1}{4}, k = \pm 1, \pm 3 \\ 0, \text{elsewhere} \end{array}\right\}$$

and $$E[a_i a_j] = 0, i \neq j$$

the time domain representation is $$x(t) = -\frac{2T^2}{\pi} \sum_i a_i \sin\left[(t - iT)\frac{\pi}{T}\right]\frac{1}{T^2 - (t - iT)^2} \quad (25)$$

It therefore is of interest to find the autocorrelation of the above stochastic process.

Assuming ergodicity of the autocorrelation (The Appendix presents analytical subtleties associated with this assumption) so as to be able to do a time-averaging rather than an ensemble average, we have $$R(\tau) = E\{x(t+\tau)x(t)\} = R(-\tau) \quad (26)$$

$$R(\tau) = \lim_{A \to \infty} \frac{1}{2A} \int_{-A}^{A} x(t+\tau)x(t)dt \quad (27)$$

Combining (25) and (27) above, we have: (assuming wide-sense stationarity)

$$R(\tau) = \lim_{A \to \infty} \frac{4T^4}{2\pi^2 A} \int_{-A}^{A} \left\{\sum_i a_i \sin\left[(t - iT)\frac{\pi}{T}\right] \cdot \frac{1}{T^2 - (t - iT)^2}\right\} \cdot$$

$$\left\{\sum_j a_j \sin\left[(t + \tau - jT)\frac{\pi}{T}\right] \cdot \frac{1}{T^2 - (t + \tau - jT)^2}\right\}$$

But $$\lim_{A \to \infty} \frac{4T^4}{2\pi^2 A} \int_{-A}^{A} a_i a_j \cdot \text{function}(t, \tau, T, i, j)dt = 0, \text{if } f \cdot i \neq j$$

This is easiest to see by considering the dual definition of autocorrelation given by (26), i.e., $$E\left\{a_i a_j \cdot \sin\left[(t - iT)\frac{\pi}{T}\right]\sin\left[(t + \tau - jT)\frac{\pi}{T}\right] \cdot \frac{1}{[T^2 - (t + \tau - jT)^2][T^2 - (t - iT)^2]}\right\} = 0$$

hence $$R(\tau) = \lim_{A \to \infty} \frac{4T^4}{\pi^2 A 2} \int_{-A}^{A} a_i^2 \sin\left[(t - iT)\frac{\pi}{T}\right]\sin\left[(t + \tau - iT)\frac{\pi}{T}\right] \cdot \frac{dt}{[T^2 - (t - iT)^2][T^2 - (t + \tau - iT)^2]}$$

But since $R(Y)$ is independent of time origin by the assumption of wide sense stationarity, the above simplifies to $$R(\tau) = \lim_{A \to \infty} \frac{4T^4 a_i^2}{2\pi^2 A} \int_{-A}^{A} \sin\left(\frac{t\pi}{T}\right)\sin\left[(t + \tau)\frac{\pi}{T}\right] \cdot \frac{dt}{(T^2 - t^2)[T^2 - (t + \tau)^2]} \quad (28)$$

It is of interest to consider what happens at $\tau$ T, viz.:

$$R(T) = \lim_{A \to \infty} \frac{1}{2A} \int_{-A}^{A} \sin\left(\frac{t\pi}{T}\right)\sin\left(\frac{t\pi}{T} + \pi\right)\frac{dt}{(T^2 - t^2)(-t^2 - 2tT)} \quad (29)$$

$$= \lim_{A \to \infty} \frac{1}{2A} \int_{-A}^{A} \sin^2\left(\frac{t\pi}{T}\right)\frac{dt}{(T^2 - t^2)(t^2 + 2tT)} \quad (30)$$

This is neither an even nor an odd integrand and it is not obvious if the integral goes to zero or not.

The fundamental equation (19) above is cumbersome to pursue analytically; it is thus rewritten below in a form which is convenient for straight numerical integration.

$$R(T) \approx \frac{4T^4}{2\pi^2 A} \int_{-A}^{A} \sin\left(\frac{t\pi}{T}\right) \sin\left[(t+\tau)\frac{\pi}{T}\right] \frac{dt}{(T^2 - t^2)[T^2 - (t+\tau)^2]} \quad (31)$$

Let:

$$t = \frac{iT}{Q}, Q \gg 1, i, Q = integers$$

$$\tau = \frac{kT}{G}, 1 < G < Q, G = integer.$$

Equation (9) then becomes $$R(\tau) \approx \frac{4T^4}{\pi^2 2A} \sum_{i=-N}^{N} \sin\left(\frac{iT\pi}{TQ}\right) \sin\left[\left(\frac{iT}{Q} + \frac{kT}{G}\right)\frac{\pi}{T}\right] \frac{2A/2N+1}{\left[T^2 - \left(\frac{iT}{Q}\right)^2\right]\left[T^2 - \left(\frac{iT}{Q} + \frac{kT}{G}\right)^2\right]}$$

$$\approx \frac{4}{\pi^2(2N+1)} \sum_{i=-N}^{N} \sin\left(\frac{i\pi}{Q}\right) \sin\left[\left(\frac{i}{Q} + \frac{k}{G}\right)\pi\right] \cdot \frac{1}{\left[1 - \left(\frac{i}{Q}\right)^2\right] \cdot \left[1 - \left(\frac{i}{Q} + \frac{k}{G}\right)^2\right]}$$

and, for large $N$, $(2N+1) \rightarrow (2N)$.

Letting $i \stackrel{\Delta}{=} j - N - 1$ the above reduces to $$R(k) \approx \frac{2}{\pi^2 N} \sum_{j=1}^{2N+1} \left\{ \frac{\sin\left[\left(\frac{j-N-1}{Q}\right)\pi\right] \cdot \sin\left[\left(\frac{j-N-1}{Q} + \frac{k}{G}\right)\pi\right]}{\left[1 - \left(\frac{j-N-1}{Q}\right)^2\right] \cdot \left[1 - \left(\frac{j-N-1}{Q} + \frac{k}{G}\right)^2\right]} \right\} \quad (32)$$

Implementation Considerations

The combined adaptive equalizer and digital filter of the invention is shown in a typical modem configuration in FIG. 10.

This figure shows in very general block diagram form, the tap-controlling logic 72 for the adjustable digital filter 70 and the input signals supplied thereto. FIG. 10 specifically shows the tap controlling logic 72 performing the general tap gain adjustment of Equation (7b).

Figure 11:
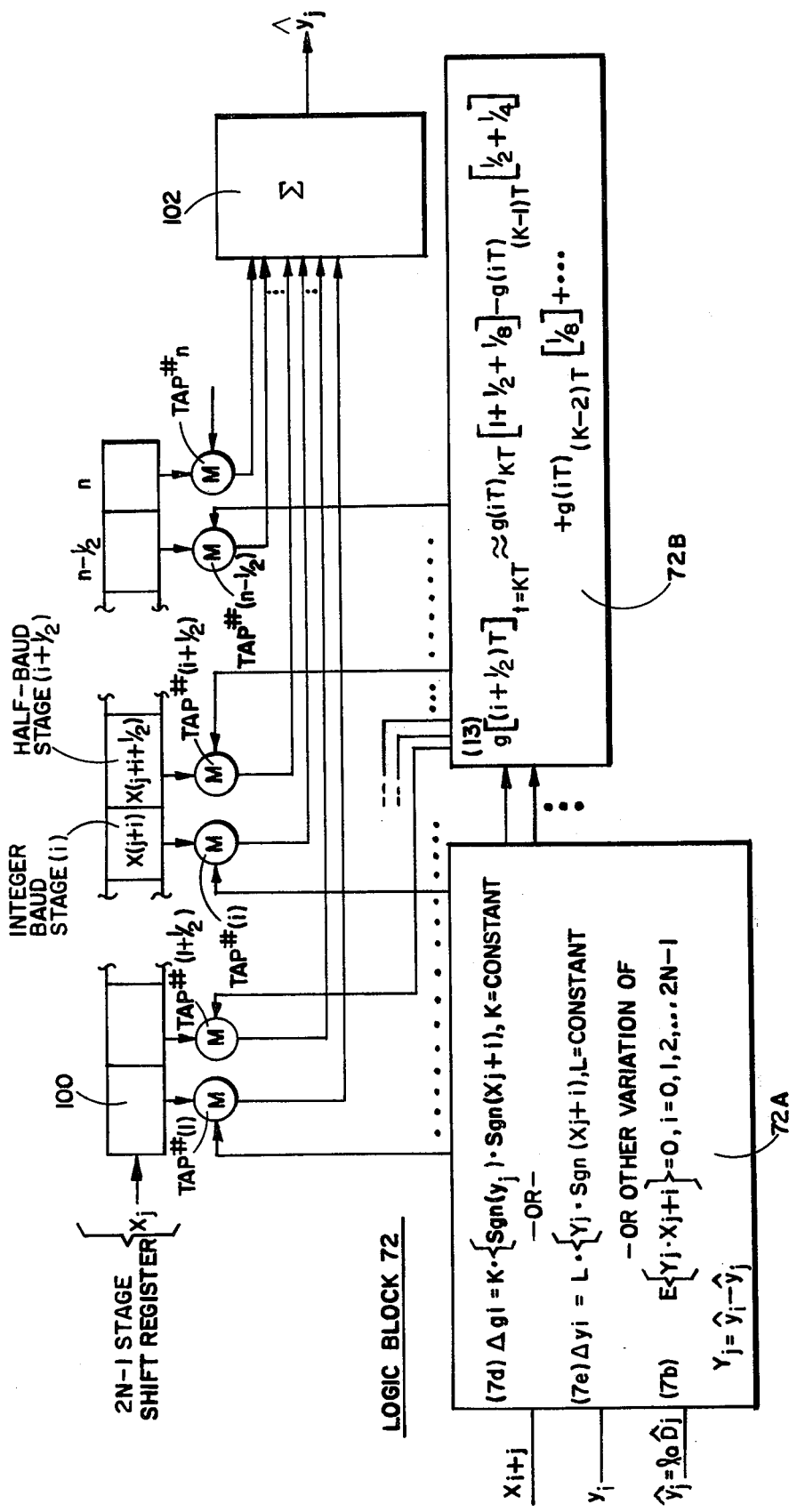
FIG. 11 is a functional block diagram illustrating the basic arrangement of inputs to logic blocks performing the necessary algorithms for achieving tap gain adjustments in accordance with a first embodiment of the invention.

FIG. 11 is a functional block illustrating the operations being performed in FIG. 10 in somewhat more detail. Specifically, logic block 72 is now shown as including a first block 72a for controlling an integer baud stage (i) and a second logic block 72b for controlling a half-baud stage (i+½) in accordance with the tap gain adjustments of the adjacent integer baud stage (i). The input signal ($x_j$) is applied to the shift register 100 having 2N-1 stages. It is understood that each of the multipliers M receives a tap gain adjustment in accordance with its being a whole number integer or half-number stage and that all of the multiplier outputs are summed as illustrated by summer 102 to provide the filtered and equalized signal sample outputs $y_j$. Where the integer baud adjustments are in accordance with Equation (7d) as indicated in block 72a, it is apparent that the multipliers may be exclusive OR gates rather than actual multipliers since the tap gain adjustment will be an algebraic sign change. Where proportional control as in Equation (7e) is performed, the multipliers will have to be actual multipliers.

Figure 12:
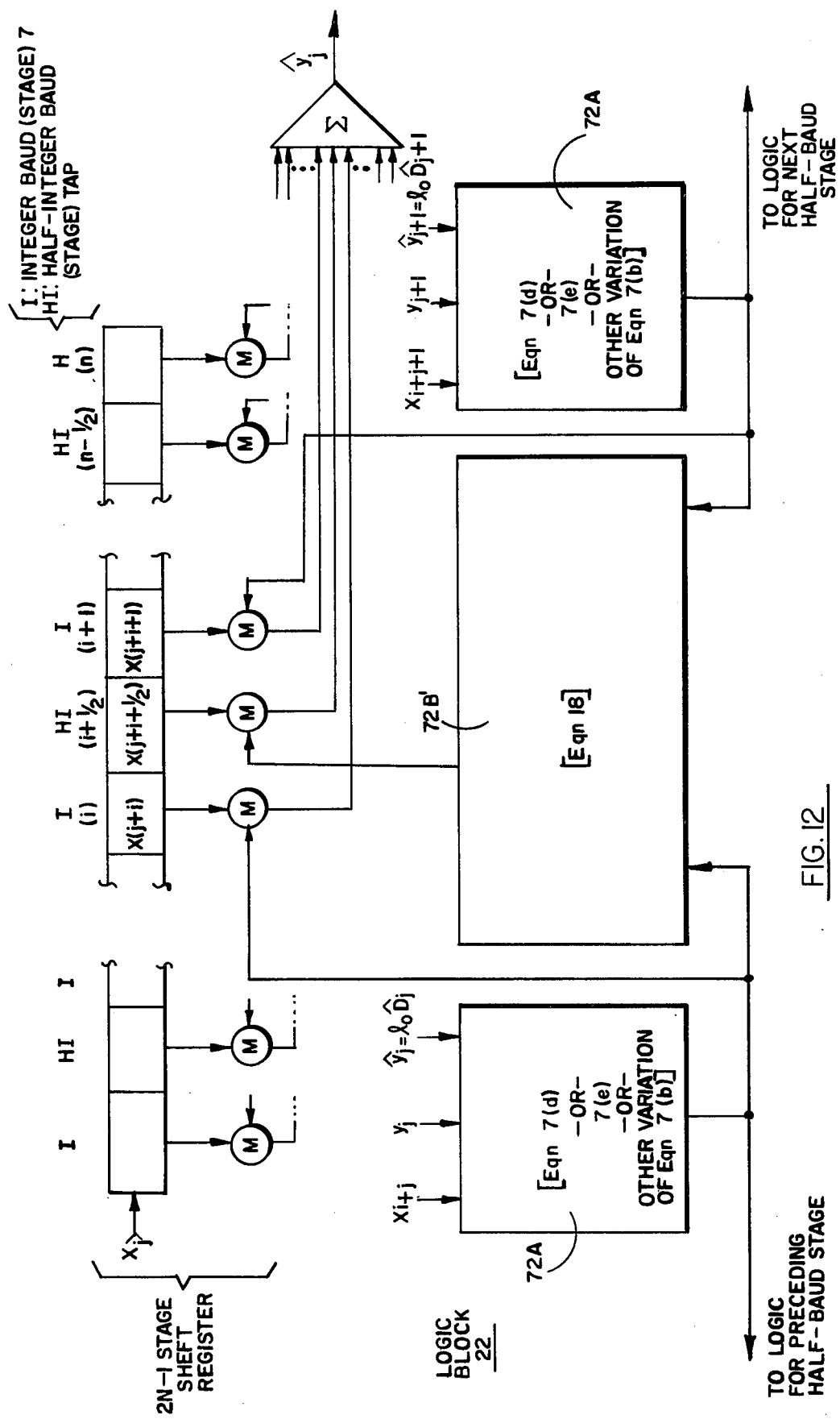
FIG. 12 is a functional block diagram illustrating the basic arrangement of inputs to logic blocks performing the necessary algorithms for achieving tap gain adjustments in accordance with a second embodiment of the invention.

FIG. 12 is a functional block diagram similar to that of FIG. 11 but wherein the half-baud stage (i+½) is now controlled as to its tap gain settings as a function of the tap gain settings of the adjacent interger baud stages (i) and (i+1). In this instance, each of the integer baud stages has an identical logic block 72a, but the half-baud logic block 72b' now receives inputs from the two adjacent logic blocks 72a and performs the function of Equation (18) or (18b). It is also apparent that each of the integer baud stages 72a provides its output to the respective, adjacent half-baud stages, for use by their respective logic blocks, as indicated.

Figure 13:
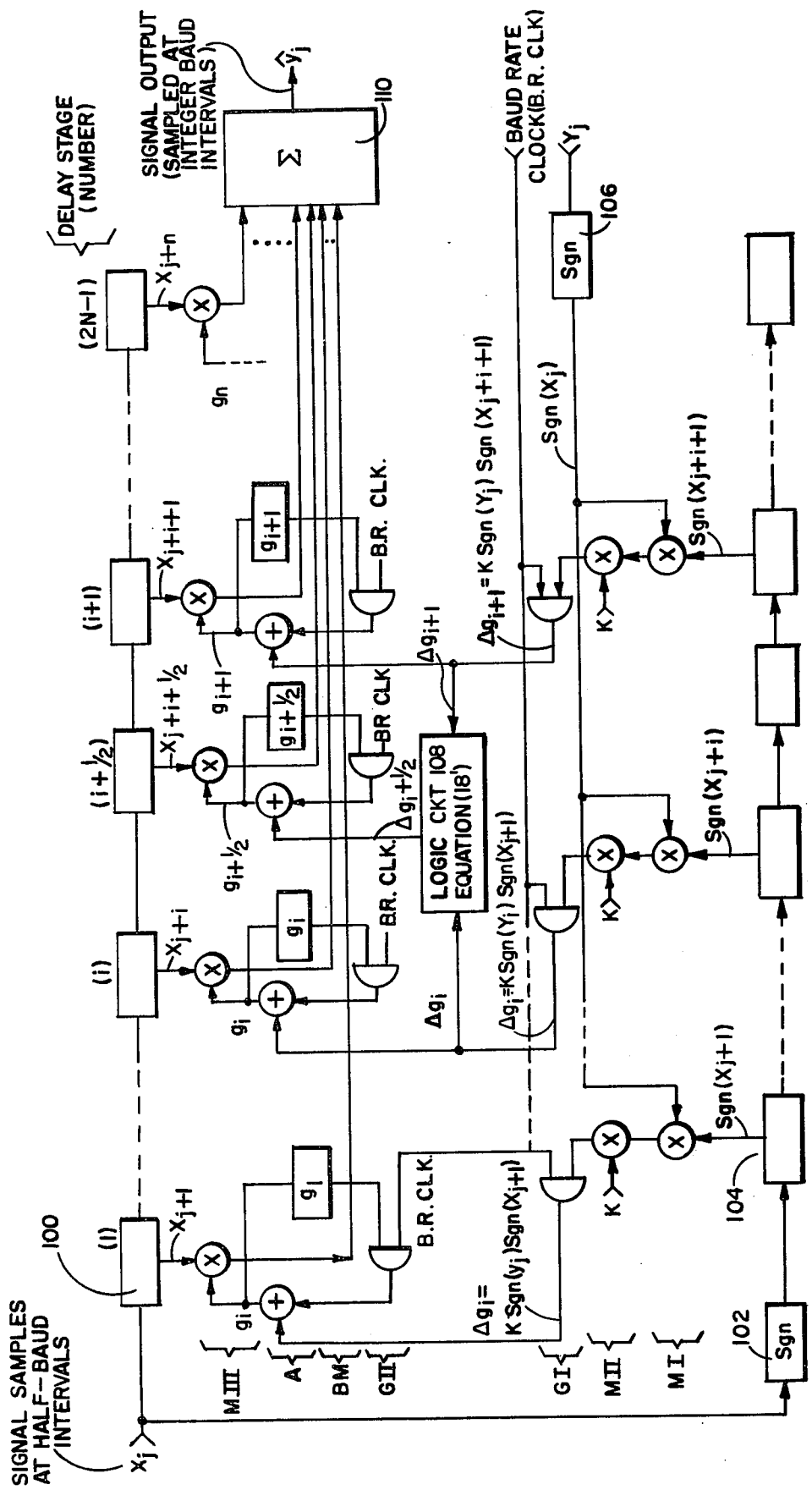
FIG. 13 is a detailed block diagram of the system of the invention in accordance with FIG. 11.

FIG. 13 shows an illustrative logic circuit for the logic block 72 of FIG. 11. FIG. 13 specifically implements the integer-baud tap gain control of Equaton (7d) and the half-baud tap gain control of Equation (18)' which is the corresponding $\Delta g$ function of Equation (18), or $$\Delta g[(i+\tfrac{1}{2})T]_{i=KT} \approx \tfrac{1}{2} \cdot \{\Delta g \ (iT)_{KT} \cdot [1+\tfrac{1}{2}+\tfrac{1}{8}] + \Delta g[(i+1) \ T]_{KT} \cdot [1-\tfrac{1}{2}+\tfrac{1}{8}] - \Delta g(iT)_{(K-1)T} \cdot [\tfrac{1}{2}+\tfrac{1}{4}] + \Delta g[(i+1) \ T]_{(K-1)T} \cdot [\tfrac{1}{2} - \tfrac{1}{4}] + \Delta g \ (iT)_{(K-2)T} \cdot [\tfrac{1}{8}] + \Delta g[(i+1)T]_{(K-2)T} \cdot [\tfrac{1}{8}]\} \quad (18)'$$

Figure 14:
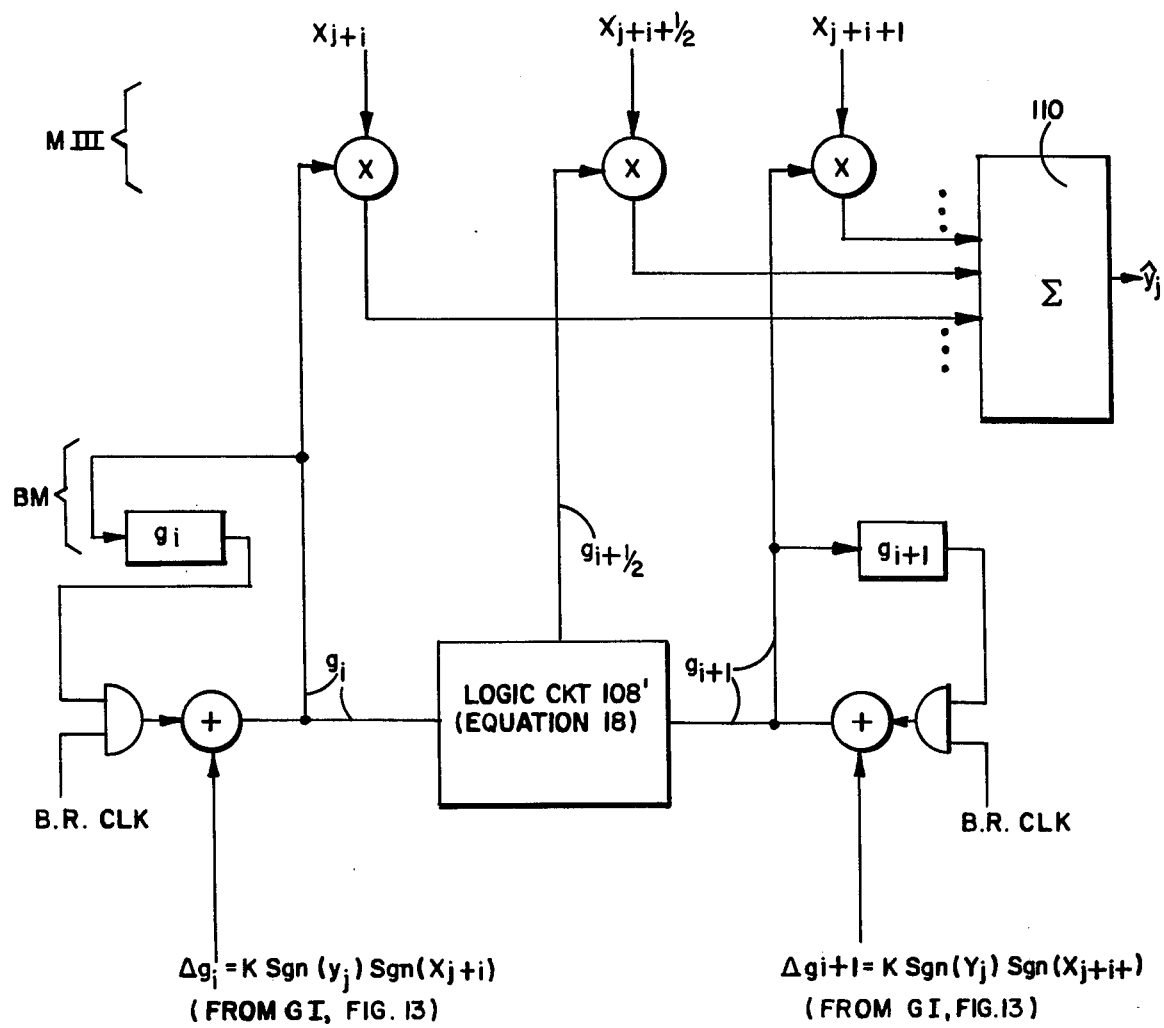
FIGS. 14 to 17 are alternative embodiments of FIG. 13.

In equation (18), K designates the tap gain settings at a present time (baud interval) and K−1, K−2, etc. prior baud intervals for the immediately preceding (i) and succeeding (i+1) integer baud tap with respect to a given half-baud tap (i+½). The basic equation may also be expanded to include contributions from the successively preceding (i−1, i−2, ...) and succeeding (i+1, i+2, ...) tapsboth taps both the present (K) or prior (K−1, K−2, etc.) time baud intervals, as lated detailed. The alternative implementation of logic block 108 to generate the actual settings ($g_i$) rather than ($\Delta g_i$) is apparent, as shown in FIG. 14 to be discussed.

In FIG. 13, shift register 100 includes 2N−1 stages which are operative in the processing functions. It is significant that in all implementations of the disclosed adaptive filter, the input to that device is at twice the baud rate, but the output from the summer is only used at once every baud, i.e., at half the input rate. The samples $x(j)$, occurring at the one-half baud rate, are processed through a sign taking circuit (Sgn) 102 and supplied to a shift register 104 having a corresponding number of stages as the shift register 100.

A first row of multipliers designated MI receive the outputs of the integer baud sign values of $x(j)$ — i.e., Sgn $(x_{j+1})$..., and also a second input Sgn $(Y_j)$ derived by the sign taking circuit 106 from the error input $Y_j$.

The second row of multipliers MII receives the outputs of the corresponding multipliers MI and each also receives the constant input K. The outputs of the multipliers MII are supplied as first inputs to respectively corresponding gates of the group GI, the second inputs to the gates GI being in common, a baud rate clock. (It is to be noted that only integer-baud sign samples of the input $x_j$ are derived from shift register 104 and hence that the multipliers MI and MII and gates GI correspond in number and function only to integer-baud samples and operate only at the integer-baud rate.) The multipliers MII perform the function of Equation (7d) and the gates GI, as a result of the clock input, provide those $\Delta g$ values at the baud clock rate to the adders A, which provide the "up-dated" values $g$ to the corresponding multipliers MIII (i.e., the "tap gains") for the integer-baud stages.

Buffer memories BM store those up-dated tap gain settings g for each baud interval, which then are gated through gates GII by the baud rate clock to the adders A for repeating this "g" up-date operation in each successive baud rate interval.

Each of the multipliers MIII receives the respectively corresponding signal samples $x_{j-1}, \ldots x_{j+2}, x_{j+1+\frac{1}{2}}, x_{j+1}, \ldots x_{j+n}$ from the successive stages of the shift register 100. The multipliers of the group MIII associated with the half-baud samples in the register 100 receive as one input the corresponding half-baud signal samples (for example, $x_{j+i+\frac{1}{2}}$) positions of the register 100 and receive a gain setting control up-dated in each baud interval by a logic circuit 108 driven by the output of the gates G of the adjacent interger-bauds. The number ($n$) of the interger-baud tap gain settings used for controlling a given half-baud tap gain is selected as desired. Accordingly, logic circuit 108 is illustrated as receiving two or more of both the high number and lower number integer baud tap gain settings for generating the tap gain adjustment $\Delta g_{i+1/2}$ for the corresponding, given tap gain $g_{i+1/2}$.

Logic circuit 108 and related circuitry, of course, are repeated for each half-baud stage. As for the integer-baud stages, each half-baud stage includes a buffer memory BM for storing the current, up-dated tap gain setting (e.g. $g_{i+\frac{1}{2}}$) and a gate GII for supply thereof in each baud interval to a corresponding adder A. The adder A then adds the new increment $\Delta g_{i+\frac{1}{2}}$ to the prior setting $g_{i+\frac{1}{2}}$ and supplies the sum as the updated half-baud gain setting $g_{i+\frac{1}{2}}$ to the corresponding multiplier MIII.

The outputs of all multipliers MIII are supplied to the summer 110 and the resulting sums, sampled at the baud rate, are supplied as the equalized and filtered output samples $\hat{Y}_j$, in accordance with Equation (4):

$$\hat{y}_j = \sum_{k=0}^{2N-1} g(k) \times (j+k) \quad (4)$$

It is noted that new input data for adjusting the tap gain settings is available every integer baud only and not every halfbaud. The actual instant, however, at which the taps are adjusted need not be specified to accuracy of more than "within one baud".

The circuit of FIG. 13 is an illustrative embodiment only, of the type of circuit suitable for implementing the present invention. Alternative embodiments will be apparent to those of skill in the art.

FIG. 14, for example, shows an embodiment employing Equation (18) directly to obtain the half-baud settings, for example $g_{i+1/2}$ as in FIG. 13. (Only those portions of FIG. 13 which are altered for this purpose are shown in FIG. 14.) Hence, integer baud settings $g_i$ and $g_{i+1}$ are stored in memories BF as in FIG. 13 and updated through adders A as before. The circuit 108 implementing Equation (18), however, directly provides the half-baud setting $g_{i+1/2}$ at each baud interval from the current, up-dated integer baud gain settings $g_i$, $g_{i-1}, \ldots$ and $g_i, g_{i+1}, \ldots$.

Figure 15:
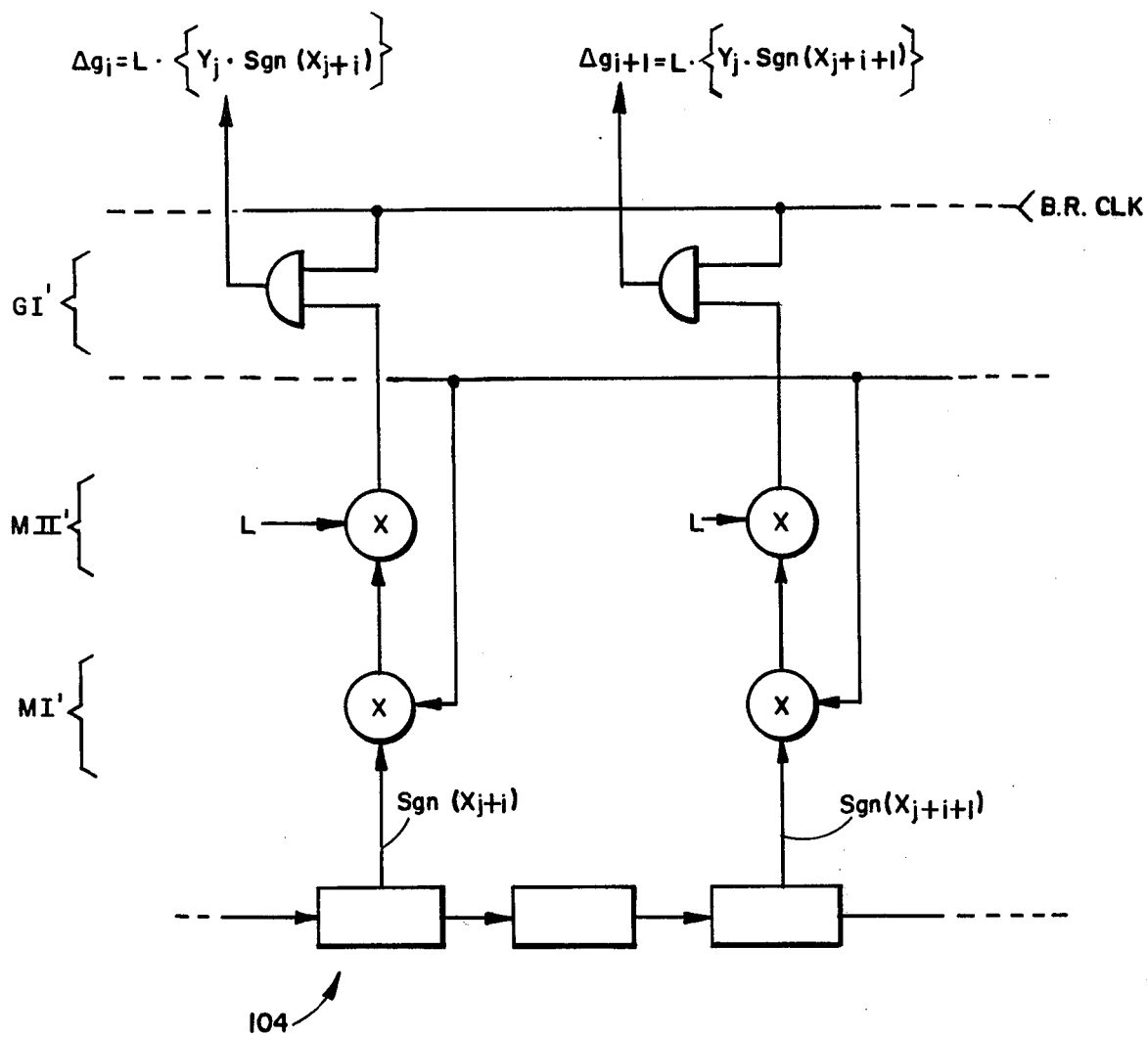

Whereas FIG. 13 implements Equation (7d) for the integer-baud tap gain adjustments, the modification thereof to implement proportional control as in Equation (7e) as well is apparent, as seen in FIG. 15. $Y_j$ is applied directly to the multipliers MI'. Whereas FIG. 13 employs only sign values, permitting use of simple exclusive OR gates as the multipliers MI and MII, the semiproportional control of FIG. 15 requires the use of actual multipliers, hence designated MI' and MII'.

Figure 16:
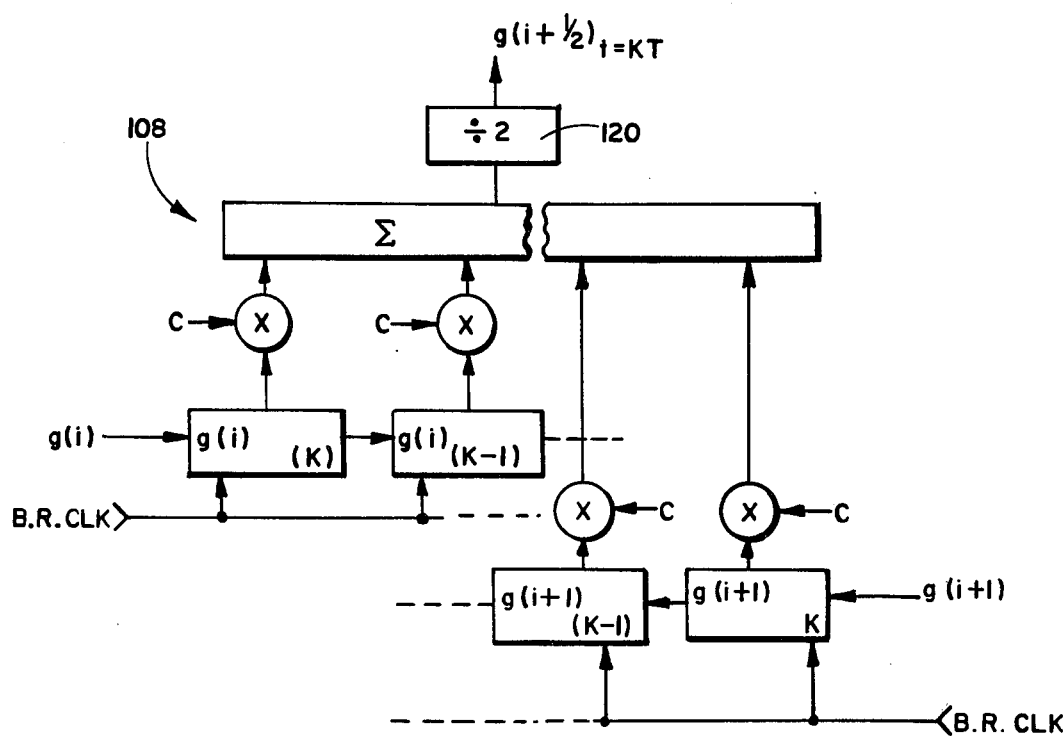

In each of FIGS. 13, and 14, logic block 108 includes storage stages K, K-1, K-2, ... for each of the adjacent integer baud tap gain for the present and successively preceding baud intervals K, K-1, K-2, ... respectively, as shown in FIG. 16. Equations 18 (and 18') are expanded only to the two preceding time (baud) intervals K-1 and K-2; extension to further preceding baud intervals, both mathematically (see Equation 18b) and in implementation, is apparent. In FIG. 16, the delay stages are labelled as specified above, and the gains are clocked to successive stages by the baud rate (Clock B. R. CLK.) Each of the delay stages provides an output to a corresponding multiplier which receives a constant input C in accordance with Equation (18). The multiplied outputs are summed and supplied to a divide by (2) circuit 120 which produces the output $g(i+\frac{1}{2})_{t=KT}$ of Equation (18). (This is the same output shown in simpler notation in FIGS. 13–15 as $g_{(i+1/2)}$.)

Where the circuit of FIG. 16 includes only the K stages, and hence uses only current time intervals, it is apparent that the function of Equation (18b) is performed.

FIG. 16 also represents the implementation of Equation (18'), if all the 'g' terms are read as "$\Delta g$" terms.

The basic equation (7) may also be expanded to utilize the successively adjacent integer tap gains, both preceding [$(a-1), (i-2), \ldots$] and succeeding [$(i+1), (i+2), \ldots$] a given half-integer baud stage $(i+\frac{1}{2})$ for controlling the associated tap settings, where only the present (K) settings are used, the values may be employed, as follows:

$$g[(i+\tfrac{1}{2})T] = \tfrac{1}{2} \cdot \{g(iT) \cdot [13/16] + g[(i+1)T] \cdot [5/16] + g[(i-1)T] \cdot [11/256] + g[(i+2)T] \cdot 4/256] + g[(i-2)T] \cdot [9/4096] + g[(i+3)T] \cdot [3/4096] + g[(i-3)T] \cdot [7/65,536] + g[(i+4)T] \cdot [2/65,536] + \ldots\} \quad (33)$$

The rapid decrease in value of the multiplicative constants in Equation (33) for the successively displaced integer top gains also indicates that adequate control is derived by using only the immediately adjacent integer taps per Equation (18b). As before noted, the $\Delta g[(i+\frac{1}{2})T]$ function of Equation (33) may be obtained merely by substituting ($\Delta g$) for each ($g$) term.

Figure 17:
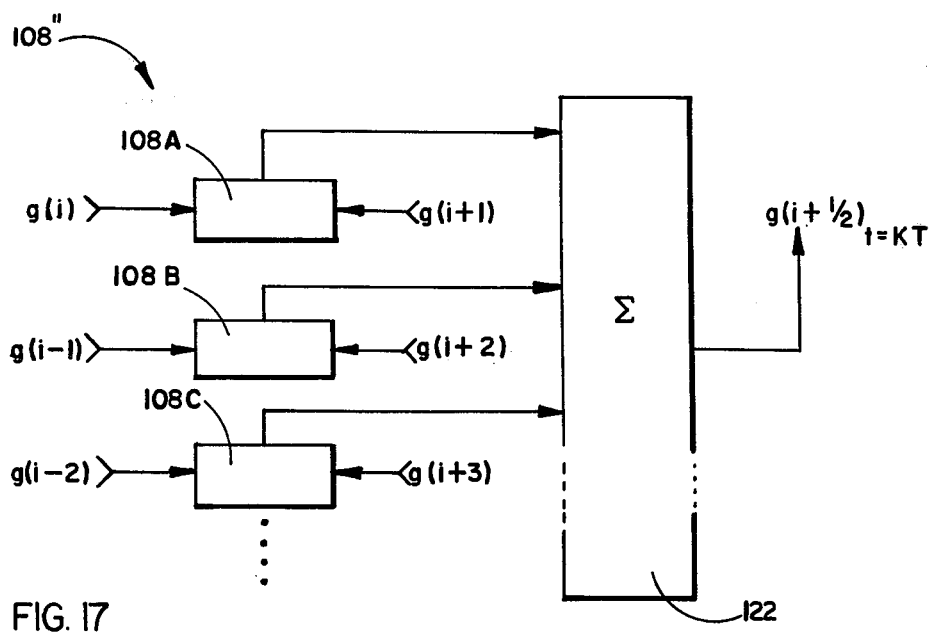

It will also be seen that both plural time, i.e., present [K] and prior [(K−1), (K−2), . . . ] gain settings for each of plural preceding [($g(i)$, $g(−1)$, $g(1−2)$, . . . ] and succeeding [$g(i+1)$, $g(i+2)$, . . . )] taps may be employed. The derivation, while straightforward and apparent, is not presented. The circuit implementation, however, is shown in FIG. 17, wherein logic circuit 108" includes plural portions 108A and 108B, . . . . Portion 108A may correspond to FIG. 16 and succeeding portions 108B and 108C, etc. may also correspond to FIG. 16, with appropriately modified constants C. The outputs of each portion then are summed by summer 122 to produce the $g(1+\frac{1}{2})_{t=KT}$ output.

It will be appreciated that the adjustment $\Delta g[i+\frac{1}{2})T]$ instead of generation of $g[(i+\frac{1}{2})T]$ may be performed, as above explained.

CONCLUSION

The foregoing has provided a substantially complete mathematical derivation of the algorithms for driving all tap gains of a digital filter as well as illustrative embodiments of such a filter, so that it will perform the functions of both an adaptive equalizer and a conventional digital filter, as those elements are provided separately in the prior art. This results also in dispensing with the need for various hardware (e.g., logic circuits) associated therewith − for example, the (approximately) twenty multipliers corresponding to the twenty delay stages of a separate equalizer (as in one prior art embodiment) are also eliminated.

Since the signal-to-noise performance of a receiver is degraded when a large number of "delay-and-add" stages are cascaded, disposing of approximately 20 such stages offers a substantial performance improvement, especially with respect to the ratio. It should be appreciated, moreover, that this performance improvement is not achieved at the expense of any increased amount of intersymbol interference. This should readily be appreciated, because intersymbol interference is not proportional to the total number of "delay-and-add" stages of a modem receiver (i.e., those of the filter plus those of the separate equalizer), but is primarily related to the quality of the algorithm which adjusts the adjustable taps and to the number of these adjustable taps.

As will be appreciated, computer simulations or analytic approximations are to be employed to establish the number of stages, etc. for any given particular channel.

While the algorithms set forth above have been specifically developed to implement a type IV partial response coding system, the necessary algorithms for other types of coding, of course, can be developed consistent with the basic concept of this invention of eliminating a separate equalizer and having the equalizer functions performed by a suitably driven, adjustable digital filter. Numerous other implementations of the invention for the specific algorithms shown, or for such other algorithms as may be employed consistent with the foregoing, will also be apparent to those of skill in the art. Alternative error criterion are also known and may be employed, if desired, with a corresponding modification of the derived algorithm. The Mean Square Error M.S.E. criterion is shown herein, since it typically is implemented more readily. Moreover, the half baud tap gain adjustment algorithm has been shown in many different forms herein, utilizing either or both of from one to a plurality of integer baud tap gain adjustments in from one (the present) to a plurality of (the present and past) time intervals.

Whereas, theoretically, optimum results are achieved when both plural tap adjustments and plural intervals are employed, it appears that the preferred circuit design, both as to practical implementation and effectiveness (i.e, speed of convergence) is one employing the adjustments of the preceding and succeeding integer baud taps in a present time interval only. The invention and the claims herein accordingly are to be construed as allowing for and encompassing variations and alternatives as indicated in the foregoing, as will be apparent to those of skill in the art. Accordingly, it is intended by the appended claims to cover all such modifications and adaptations which fall within the true spirit and scope of the invention.

APPENDIX

Ergodicity of the Autocorrelation

In deriving the autocorrelation of the stochastic process which characterizes the randomized data stream in type IV partial response signaling, it was assumed that $$E\{x(t+\tau)x(t)\} = \lim_{T \to \infty} \frac{1}{2T} \int_{-T}^{T} x(t+\tau)x(t)dt \qquad (37)$$

This is obviously not always the case. For example, the stochastic process $$x(t) = a$$

where $a$ is a random variable with nonzero variance, (38) does not hold.

While ergodicity is not required in its most general form for (37) to be correct, ergodicity of the autocorrelation is a prerequisite.

It can be proved* that a necessary and sufficient condition for Equation (37) to be true is that $$\lim_{T \to \infty} \frac{1}{T} \int_0^{2T} \left(1 - \frac{\lambda}{2T}\right)[R_{\phi\phi}(\lambda) - R^2(\tau)]d\lambda = 0$$

\*
See any stochastic processes textbook for proof., e.g., "Stochastic Processes" by A. Papoulis, McGraw-Hill 1965.
The term in the brackets is the autocovariance of the process $$\phi(t) \triangleq x(t+\tau)x(t)$$

i.e.

$$R_{\phi\phi}(\lambda) = E\{x(t+\lambda)x(t+\lambda)x(t+\tau)x(t)\}$$

Testing for ergodicity of the autocorrelation is an academic question in that it requires knowledge of fourth-order moments.

The estimation of $R(\tau)$ by a time average of finite duration presents an assortment of problems. Where great precision is required, it is preferable to use the mean-lagged products approach.*

*See "Microcycle Spectral Estimates" by M. A. Caloyannides, Journal of Applied Physics, Volume 45, number 1, pp 307–316.

To a reasonable degree of accuracy, ergodicity of the autocorrelation can be considered a valid assumption for a randomized data stream of type IV partial-response signaling, and the discussion of this application is thus valid.

What is claimed is:

1. An adjustable digital filter for use in a digital data transmission and receiving system for digitally filtering and equalizing a received data signal supplied to the filter as digital data samples $x_j$ at twice the baud rate of data transmission and including successive, alternating integer-baud and half-baud samples, comprising:

a plurality of successive delay stages for storing successive said digital data samples, a corresponding plurality of adjustable tap gain means respectively associated with said plurality of delay stages, each receiving the samples currently stored in the respectively associated delay stages and a corresponding tap gain control as inputs thereto, and producing as an output thereof the product of the inputs thereto, means for summing the outputs of said tap gain means and producing a filtered and equalized output sample $\hat{y}_j$ in each baud interval for the corresponding integer baud sample $x_j$, means responsive to each sample $\hat{y}_j$ for generating a corresponding estimated value $l_o D_j$ representing an estimate of the value of a correctly equalized and filtered output sample $y_j$, means responsive to said summing means and also responsive to said estimated value generating means for generating an error signal $Y_j = \hat{Y}_j - l_o D_j$, first means for adjusting the tap gain control inputs to each of the adjustable tap gain means associated with said delay stages storing integer baud samples of said succession of samples, as a function of said error signal $Y_j$ and said digital data samples $x_j$, and second means for adjusting the tap gain control inputs to each adjustable tap gain means associated with a delay stage storing half-integer baud samples of said succession of samples as a function of the adjustment by said first adjusting means to the tap gain control input to the adjustable tap gain means associated with at least one integer baud sample storing delay stage respectively corresponding thereto.

2. An adjustable digital filter as recited in claim 1 wherein said second means adjust the tap gain control inputs to each of the adjustable tap gain means associated with said delay stages storing half-integer baud samples as a function of the adjustments by said first adjusting means of the tap gain control inputs to the said next adjacent integer baud sample storing delay stage in at least a current and a preceding baud time interval.

3. An adjustable digital filter as recited in claim 1 wherein said second means adjust the tap gain control inputs to each of the adjustable tap gain means associated with said delay stages storing half-integer baud samples as a function of the adjustments by said first adjusting means of the tap gain control inputs to at least the respectively preceding and succeeding next adjacent integer baud sample storing delay stages of said successive delay stages for each said half-integer baud sample storing delay stage.

4. An adjustable digital filter as recited in claim 3 wherein said second means adjust the tap gain control inputs to each of the adjustable tap gain means associated with said delay stages storing half-integer baud samples as a function of the adjustments by said first adjusting means of the tap gain control inputs to at least the respectively preceding and succeeding next adjacent integer baud sample storing delay stages of said successive delay stages in at least a current and a preceding baud time interval, for each said half-integer baud sample storing delay stage.

5. An adjustable digital filter as recited in claim 1 wherein said second means adjust the tap gain control inputs to each of the adjustable tap gain means associated with said delay stages storing half-integer baud samples as a function of the adjustments by said first adjusting means of the tap gain control inputs to at least the respectively two preceding and two succeeding next adjacent integer baud sample storing delay stages of said successive delay stages for each said half-integer baud sample storing delay stage.

6. An adjustable digital filter as recited in claim 5 wherein said second means adjust the tap gain control inputs to each of the adjustable tap gain means associated with said delay stages storing half-integer baud samples as a function of the adjustments by said first adjusting means of the tap gain control inputs to at least the respectively preceding and succeeding next adjacent integer baud sample storing delay stages of said successive delay stages in at least a current and a preceding baud time interval, for each said half-integer baud sample storing delay stage.

7. An adjustable digital filter for use in a digital data transmission and receiving system for digitally filtering and equalizing a received data signal supplied to the filter as digital data samples $x_j$ at twice the baud rate of data transmission and including successive, alternating integer-baud and half-baud samples, comprising:

means including a plurality of $(2N-1)$ successive delay stages for storing $(2N-1)$ successive ones of said digital data samples $x_j$, a corresponding plurality of adjustable tap gain means respectively associated with said plurality of delay stages, each receiving the sample currently stored in the respectively associated delay stage and a corresponding tap gain control as inputs thereto, and producing as an output thereof the product of the inputs thereto, means for summing the outputs of said tap gain means and producing a filtered and equalized output sample $\hat{y}_j$ in each baud interval for the corresponding integer-baud sample $x_j$, means responsive to each sample $\hat{y}_j$ for generating a corresponding, estimated value $[y_j] l_o D_j$, means responsive to said summing means and also responsive to said estimated value generating means for generating an error signal $Y_j = [\hat{y}_j - y_j]$ $\hat{y}_j - l_o D_j$ where $[y_j] l_o D_j$ represents an estimate of the value of the correctly equalized and filtered output sample $[y_j] y_j$, means for generating tap gain control inputs for adjusting the said adjustable top gain means for each said sample $x_j$ in accordance with $[0 = E_j \, e(j) \times (j + i) \,]$
$0 \cong E_j \{Y(j) \, x(j + i)\}$ where $i = 0, 1, 2, \ldots (2N - 1)$, and identifies the tap gain means $(i)$ of the plurality $(2N - 1)$ thereof. [, and $e(j) = y(j) - \overline{y}(j)$.]

8. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stage respectively next adjacent each said half-integer baud sample storing delay stage in accordance with:

$$g[(i+\tfrac{1}{2})T]_{t=KT} = g(iT)_{KT} \cdot [1+\tfrac{1}{2}+\tfrac{1}{8}] - g(iT)_{(K-1)T} \cdot [\tfrac{1}{2}+\tfrac{1}{4}] + g(iT)_{(K-2)T} \cdot [\tfrac{1}{8}]$$

9. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stages respectively preceding and succeeding, and next adjacent each said half-integer baud sample storing delay stage in accordance with:

$$\begin{aligned}g[(i+\tfrac{1}{2})T]_{t=KT} &= \tfrac{1}{2}\{g(iT)_{KT}[1+\tfrac{1}{2}+\tfrac{1}{8}] \\ &+ g[(i+1)T]_{KT}[1-\tfrac{1}{2}+\tfrac{1}{8}] - g(iT)_{(K-1)T}[\tfrac{1}{2}+\tfrac{1}{4}] \\ &+ g[(i+1)T]_{(K-1)T}[\tfrac{1}{2}-\tfrac{1}{4}] + g(iT)_{(K-2)T} \cdot [\tfrac{1}{8}] \\ &+ g[(i+1)T]_{(K-2)T}[\tfrac{1}{8}]\}\end{aligned}$$

where $g[(1+\tfrac{1}{2})T]$ identifies the tap gain setting for a given half-baud stage $(i+\tfrac{1}{2})$, $i = 1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeding integer baud stage $(i+1)$ in a present and successively preceding baud intervals K, (K−1), and (K−2), respectively.

10. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stages respectively preceding and succeeding, and next adjacent each said half-integer baud sample storing delay stage in accordance with:

$$\begin{aligned}\Delta g[(i+\tfrac{1}{2})T]_{t=KT} &= \tfrac{1}{2}\cdot\{g(iT)_{KT} \cdot [1+\tfrac{1}{2}+\tfrac{1}{8}] \\ &+ \Delta g[(i+1)T]_{KT}[1-\tfrac{1}{2}+\tfrac{1}{8}] - \Delta g(iT)_T \cdot [\tfrac{1}{2}+\tfrac{1}{4}] \\ &+ \Delta g[(i+1)T]_{(K-1)T}[\tfrac{1}{2} - \tfrac{1}{4}] + \Delta g(iT)_{(K-2)T} \cdot [\tfrac{1}{8}] \\ &+ \Delta g[(i+1)T]_{(K-2)T}[\tfrac{1}{8}]\}\end{aligned}$$

where $g[(1+\tfrac{1}{2})T]$ identifies the tap gain setting for a given half-baud stage $(i+\tfrac{1}{2})$, $i = 1, 2, 3, \ldots n$ and $g(iT)$ is the tap gain setting for the respective, next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

11. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive interger baud sample storing delay stages respectively next adjacent, preceding and succeeding, each said half-integer baud sample storing delay stage in accordance with:

$$\begin{aligned}g[(i+\tfrac{1}{2})T]_{t=KT} &= \tfrac{1}{2}\cdot\{g(iT)_{KT}\cdot[1+\tfrac{1}{2}+\tfrac{1}{8}] \\ &+ g[(i+1)T]_{KT} \cdot [1-\tfrac{1}{2}+\tfrac{1}{8}] - g(iT)_{(K-1)T}\cdot [\tfrac{1}{2}+\tfrac{1}{4}] \\ &+ g[(i+1)T]_{(K-1)T}\cdot [\tfrac{1}{2}\cdot\tfrac{1}{4}] + g(iT)_{(K-2)T}\cdot[\tfrac{1}{8}] + g[(i+1)T]_{(K-2)T}\cdot[\tfrac{1}{8}] - g(iT)_{(K-3)T}\cdot[1/48] \\ &+ g[(i+1)T]_{(K-3)T}\cdot[1/48] + g(iT)_{(K-4)T}[1/384] \\ &+ g[(i+1)T]_{(K-4)T}\cdot[1/384] + \ldots\}\end{aligned}$$

where $g[(i+\tfrac{1}{2})T]$ identifies the tap gain setting for a given half-baud stage $(i+\tfrac{1}{2})$, $i = 1, 2, 3, \ldots n$, $g(iT)$, and $g[(i+1)T]$ are the tap gain settings for the respective, preceding and succeeding integer baud stages $(i)$ and $(i+1)$ in a present and successive, preceding baud intervals K, (K−1), and (K−2), . . . .

12. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive integer baud sample storing delay stage respectively next adjacent, preceding and succeeding, each said half-integer baud sample storing delay stage in accordance with:

$$\Delta g[(i+\tfrac{1}{2})T]_{t=KT} = \tfrac{1}{2} \cdot \{\Delta g(iT)_{KT}\,[13/8] + \Delta g[(i+1)T]_{KT}\cdot[\tfrac{5}{8}]\}$$

where $\Delta g[(i+\kappa)T]$ identifies the tap gain setting adjustment for a given half-baud stage $(i+\tfrac{1}{2})$, $i = 1, 2, 3, \ldots n$, and $\Delta g(iT)$, and $\Delta g[(i+1)T]$ are the tap gain setting adjustments for the respective preceding and succeeding integer baud stages $(i)$ and $(i+1)$ in a current time interval K.

13. An adjustable digital filter as recited in claim 7 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$$\begin{aligned}g[(i+\tfrac{1}{2})T] &= \tfrac{1}{2}\cdot\{g(iT)\cdot[13/16] + g[(i+1)T]\cdot[5/16] + g[(i-1)T]\cdot[11/256] + g[(i+2)T]\cdot[4/256] + g[(i-2)T]\cdot[9/4096] + g[(i+3)T]\cdot[3/4096] + g[(i-3)T]\cdot[7/65{,}536] + g[(i+4)T]\cdot[2/65{,}536] + \ldots\}\end{aligned}$$

where $g[(i+\tfrac{1}{2})T]$ identifies the tap gain setting for a given half-baud stage $(i+\tfrac{1}{2})$, $i = 1, 2, 3, \ldots n$, and $g(iT)$, $g(i-1)T$, . . . are the tap gain settings for the respective preceding integer baud stages $(i)$, $(i-1)$, . . . and $g[(i+1)T]$, $g[(i+2)T]$, . . . are the tap gain settings for the respective, succeeding integer baud stages $(i+1)$, $(i+2)$, . . . .

14. An adjustable digital filter as recited in claim 7 wherein said adjusting means includes first means for adjusting the tap gain control inputs to each of the adjustable tap gain means associated with said delay stages storing integer-baud samples of said succession of samples in accordance with:

$E_j^c \{Y_j \cdot \text{Sgn}(x_{j+l})\} = 0$

15. An adjustable digital filter as recited in claim 14 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stage respectively next adjacent each said half-integer baud sample storing delay stage in accordance with:

$g[(i+\frac{1}{2})T]_{t=KT} \approx g(iT)_{KT} \cdot [1+\frac{1}{2}+\frac{1}{8}] - g(iT)_{(K-1)T} \cdot [\frac{1}{2}+\frac{1}{4}] + g(iT)_{(K-2)T} \cdot [\frac{1}{8}]$

16. An adjustable digital filter as recited in claim 14 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stages respectively preceding and succeeding, and next adjacent each said half-integer baud sample storing delay stage in accordance with:

$g[(i+\frac{1}{2})T]_{t=KT} \approx \frac{1}{2}\{g(iT)_{KT} \cdot [1+\frac{1}{2}+\frac{1}{8}] + g[(i+1)T]_{KT} \cdot [1-\frac{1}{2}+\frac{1}{8}] - g(iT)_{(K-1)T} \cdot [\frac{1}{2}+\frac{1}{4}] + g[(i+1)T]_{(K-1)T} \cdot [\frac{1}{2}-\frac{1}{4}] + g(iT)_{(K-2)T} \cdot [\frac{1}{8}] + g[(i+1)T]_{(K-2)T} \cdot [\frac{1}{8}]\}$ where $g[(1+\frac{1}{2})T]$ identifies the tap gain setting for a given half-baud stage $(i+\frac{1}{2})$, $i = 1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

17. An adjustable digital filter as recited in claim 14 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud samples storing delay stages respectively preceding and succeeding, and next adjacent each said half-integer baud sample storing delay stage in accordance with:

$\Delta g[(i+\frac{1}{2})T]_{t=KT} \approx \frac{1}{2}\{g(iT)_{KT} \cdot [1+\frac{1}{2}+\frac{1}{8}] + \Delta g[(i+1)T]_{KT}[1-\frac{1}{2}+\frac{1}{8}] - \Delta g(iT)_{(K-1)T} \cdot [\frac{1}{2}+\frac{1}{4}] + \Delta g[(i+1)T]_{(K-1)T} \cdot [\frac{1}{2}-\frac{1}{4}] + \Delta g(iT)_{(K-2)T} \cdot [\frac{1}{8}] + \Delta g[(i+1)T]_{(K-2)T} \cdot [\frac{1}{8}]\}$ where $g[(1+\frac{1}{2})T]$ identifies the tap gain setting for a given half-baud stage $(i+\frac{1}{2})$, $i = 1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

18. An adjustable digital filter as recited in claim 14 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$g[(i+\frac{1}{2})t]_{t=KT} = \frac{1}{2} \cdot \{g(iT)_{iTKT}[1+\frac{1}{2}+\frac{1}{8}] + g[(i+1)T]_{KT} \cdot [1-\frac{1}{2}+\frac{1}{8}] - g(iT)_{(K-1)T} \cdot [\frac{1}{2}+\frac{1}{4}] + g[[(i+1)T]_{(K-1)T} \cdot [\frac{1}{2}-\frac{1}{4}] + g(iT)_{(K-2)T} \cdot [\frac{1}{8}] + g[(i+1)T]_{(K-2)T} \cdot [\frac{1}{8}] - g(iT)_{(K-3)T} \cdot [1/48] + g[(i+1)T]_{(K-3)T} \cdot [1/48] + g(iT)_{(K-4)T} \cdot [1/384] + g[[(i+1)T]_{(K-4)T} \cdot [1/384] + \ldots\}$ where $g[(i+\frac{1}{2})T]$ identifies the tap gain setting for a given half-baud stage $(i+\frac{1}{2})$, $i = 1, 2, 3, \ldots n$, $g(iT)$, and $g[(i+1)T]$ are the tap gain settings for the respective, preceding and succeeding integer baud stages $(i)$ and $(i+1)$ in a present and successive, preceding baud intervals K, (K−1), and (K−2), …

19. An adjustable digital filter as recited in claim 14 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$\Delta g[(i+\frac{1}{2})T]_{t=kt} = \frac{1}{2} \cdot \{\Delta g(iT)_{kt} [13/8] + \Delta g[(i+1)T]_{kr} \cdot [\frac{5}{8}]\}$ where $\Delta g[(i+\frac{1}{2})T]$ identifies the tap gain setting adjustment for a given half-baud stage $(i+\frac{1}{2})$, $i = 1, 2, 3, \ldots n$, and $\Delta g(iT)$, and $\Delta g[(i+1)T]$ are the tap gain setting adjustments for the respective preceding and succeeding integer baud stages $(i)$ and $(i+1)$ in a current time interval K.

20. An adjustable digital filter as recited in claim 14 wherein said adjusting means further includes second means for adjusting said adjustable tap gain means associted with each said delay stage storing half-integer baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$g[(i+\frac{1}{2})T] = \frac{1}{2} \cdot \{g(iT) \cdot [13/16] + g[(i+1)T] \cdot [5/16] + g[(i-1)T] \cdot [11/256] + g[(i+2)T] \cdot [4/256] + g[(i-2)T] \cdot [9/4096]\} 30 \, g[(i+3)T] \cdot [3/4096] + g[(i-3)T] \cdot [7/65{,}536] + g[(i+4)T] \cdot [2/65{,}536] + \ldots\}$ where $g[(i+\frac{1}{2})T]$ identifies the tap gain setting for a given half-baud stage $(i+\frac{1}{2})$, $i = 1, 2, 3, \ldots n$, and $g(iT)$, $g(i-1j T, \ldots$ are the tap gain settings for the respective preceding integer baud stages $(i), (i-1), \ldots$ and $g[(i+1)T], g[i+2)T], \ldots$ are the tap gain settings for the respective, succeeding integer baudstages $(i+1), (i+2), \ldots$.

21. An adjustable digital filter as recited in claim 7 wherein said adjusting means includes first means for adjusting the tap gain control inputs to each of the adjustable tap gain means associated with said delay stages storing integer-baud samples of said succession of samples in accordance with:

$\Delta g_i = L \cdot \{Y_j \cdot \text{sgn}(x_{j+l})\}, \, L = \text{constant}.$ 22. An adjustable digital filter as recited in claim 21 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stage respectively next adjacent each said half-integer baud sample storing delay stage in accordance with:

$$g[(i+\tfrac{1}{2})T]_{t=KT} \approx g \cdot (iT)_{KT} \cdot [1+\tfrac{1}{2}+\tfrac{1}{8}] - g(iT)_{(K-1)T} \cdot [\tfrac{1}{2}+\tfrac{1}{4}] + g(iT)_{K-2)T} \cdot [\tfrac{1}{8}]$$

23. An adjustable digital filter as recited in claim 21 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stages respectively preceding and succeeding, and next adjacent each said half-integer baud sample storing delay stage in accordance with:

$$g[(i+\tfrac{1}{2})T]_{T=KT} \approx \tfrac{1}{2}\{g\ (iT)_{KT}\cdot[1+\tfrac{1}{2}+\tfrac{1}{8}] + g[(i+1)T]_{KT}\cdot[1-\tfrac{1}{2}+\tfrac{1}{8}] -g(iT)_{(K-1)T}\cdot[\tfrac{1}{2}+\tfrac{1}{4}] + g[(i+1)T]_{K-1)T}\cdot[\tfrac{1}{2}-\tfrac{1}{4}] +g\ (iT)_{(K-2)T}\cdot[\tfrac{1}{8}] + g[(i+1)T]_{(K-2)T}\cdot[\tfrac{1}{8}]\}$$

where $g[(1+\tfrac{1}{2})T]$ identifies the tap gain setting for a given half-baud stage $(i+\tfrac{1}{2})$, $i=1, 2, 3, \ldots n$ and $g(iT)$ is the tap gain setting for the respective next adjacent, preceding integer baud stage $(i)$ and $g[(i+1)T]$ *is the tap gain setting for the respective, next adjacent, succeeding integer baud stage* $(i+1)$ in a present and successively preceding baud intervals K, (K−1) and (K−2), respectively.

24. An adjustable digital filter as recited in claim 21 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the integer baud sample storing delay stages respectively preceding and succeeding, and next adjacent each said half-integer baud sample storing delay stage in accordance with:

$$\Delta g[(i+\tfrac{1}{2})T]_{t=KT} \approx \tfrac{1}{2}\cdot\{g\ (iT)_{KT}\cdot[1+\tfrac{1}{2}+\tfrac{1}{8}] + \Delta g[(i+1)T]_{KT}\cdot[1-\tfrac{1}{2}+\tfrac{1}{8}] -\Delta g(iT)_{(K-1)T}\cdot[\tfrac{1}{2}+\tfrac{1}{4}] + \Delta g[(i+1)T]_{(K-1)T}\cdot[\tfrac{1}{2}-\tfrac{1}{4}] + \Delta g(iT)_{(K-2)T}\cdot[\tfrac{1}{8}] + \Delta g[(i+1)T]_{(K-2)T}\cdot[\tfrac{1}{8}]\}$$

where $g[(1+\tfrac{1}{2})T]$ identifies the tap gain setting for a given half-baud stage $(i+\tfrac{1}{2})$, $i=1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

25. An adjustable digital filter as recited in claim 21 wherein said adjusting means further includes second means for adjusting said adjustable tap gain means associated with each said delay stage storing half-integer baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$$\Delta g\ [(i+\tfrac{1}{2})T]_{t=KT} = \tfrac{1}{2}\cdot\{\Delta g\ (iT)_{KT}\ [13/8] + \Delta g[(i+1)T]_{kT}\cdot[\tfrac{5}{8}]\}$$

where $\Delta g[(i+\tfrac{1}{2})T]$ identifies the tap gain setting adjustment for a given half-baud stage $(i+\tfrac{1}{2})$, $i=1, 2, 3, \ldots n$, and $\Delta g(iT)$, and $\Delta g[(i+1)T]$ are the tap gain setting adjustments for the respective preceding and succeeding integer baud stages $(i)$ and $(i+1)$ in a current time interval K.

26. An adjustable digital filter as recited in claim 7 wherein said adjusting means includes first means for adjusting the tap gain control inputs to each of the adjustable tap gain means associated with said delay stages storing integer-baud samples of said succession of samples in accordance with:

$$\Delta g_i = K\cdot\{\text{sgn}(y_j)\cdot\text{sgn}(x_{j+i})\},\ K=\text{constant}$$

where $g[(i+\tfrac{1}{2})T]$ identifies the tap gain setting for a given half-baud stage $(i+\tfrac{1}{2})$, $i=1, 2, 3, \ldots n$, and $g(iT)$ is the tap gain setting for the respective, preceding successively next adjacent integer baud stage $(i)$ in a present and preceding baud intervals K, (K−1), and (K−2), respectively.

27. An adjustable digital filter as recited in claim 26 wherein said adjusting means further includes second means for adjusting said adjustable tap gain means associated with each said delay stage storing half-interger baud samples as a function of the adjustment by said first adjusting means of the tap gain control inputs to the adjustable tap gain means associated with the interger baud sample storing delay stage respectively next adjacent each said half-interger baud sample storing delay stage in accordance with:

$$g[(i+\tfrac{1}{2})T]_{t=KT} \approx g(iT)_{KT}\cdot[1+\tfrac{1}{2}+\tfrac{1}{8}] - g(iT)_{(K-1)T}\cdot[\tfrac{1}{2}+\tfrac{1}{4}] + g(iT)_{(K-2)T}\cdot[\tfrac{1}{8}].$$

28. An adjustable digital filter as recited in claim 26 wherein said adjusting means further includes second means for adjusting said adjustable tap gain means associated with each said delay stage storing half-interger baud samples as a function of the adjustment by said first adjusting means of the tap gain control inputs to the adjustable tap gain means associated with the interger baud sample storing delay stages respectively preceding and succeeding, and next adjacent each said halfinterger baud sample storing delay stage in accordance with:

$$g[(i+\tfrac{1}{2})T]_{t=KT} \approx \tfrac{1}{2}\{g(iT)_{KT}\ [1+\tfrac{1}{2}+\tfrac{1}{8}]\ + g[(i+1)T]_{KT}\ [1-\tfrac{1}{2}+\tfrac{1}{8}]\ -g(iT)_{(K-1)T}\ [\tfrac{1}{2}+\tfrac{1}{4}]\ + g[(i+1)T]_{(K-1)T}\ [\tfrac{1}{2}-\tfrac{1}{4}]\ +g(iT)_{(K-2)T}\ [\tfrac{1}{8}\ ]\ + g[(i+1)T]_{(K-2)T}\cdot[\tfrac{1}{8}]\}$$

where $g[(1+\tfrac{1}{2})T]$ identifies the tap gain setting for a given half-baud stage $(i+\tfrac{1}{2})$, $i=1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

29. An adjustable digital filter as recited in claim 26 wherein said adjusting means further includes second means for adjusting said adjustable tap gain means associated with each said delay stage storing halfinterger baud samples as a function of the adjustment by said first adjusting means of the tap gain control inputs to the adjustable tap gain means associated with the interger baud sample storing delay stages respectively preceding and succeeding, and next adjacent each said halfinteger baud sample storing delay stage in accordance with:

$$\Delta g[(i+\tfrac{1}{2})T]_{t=KT} \simeq \tfrac{1}{2} \cdot \{g(iT)_{KT} \cdot [1+\tfrac{1}{2}+\tfrac{1}{8}] + \Delta g[(i+1)T]_{KT} \cdot [1\;\tfrac{1}{2}+\tfrac{1}{8}] - \Delta g(iT)_{(K-1)T} \cdot [\tfrac{1}{2}+\tfrac{1}{4}] + \Delta g[(i+1)T]_{(K-1)T} \cdot [\tfrac{1}{2} - \tfrac{1}{4}] + \Delta g(iT)_{(K-2)T} \cdot [\tfrac{1}{8}] + \Delta g[(i+1)T]_{(K-2)T} \cdot [\tfrac{1}{8}]\}$$

where $g[(1+\tfrac{1}{2})T]$ identifies the tap gain setting for a given half-baud stage $(i+\tfrac{1}{2})$, $i = 1, 2, 3, \ldots n$ and $g(iT)$ is the tap gain setting for the respective next adjacent, preceding integer baud stage $(i)$ and $g[(i+1)T]$ is the tap gain setting for the respective, next adjacent, succeeding integer baud stage $(i+1)$ in a present and successively preceding baud intervals K, (K−1), and (K−2), respectively.

30. An adjustable digital filter as recited in claim 26 wherein said adjusting means further includes second means for adjusting said adjustable tap gain means associated with each said delay stage storing half-interger baud samples as a function of the adjustment by said first adjusting means of the tap gain control inputs to the adjustable tap gain means associated with the successive integer baud sample storing delay stages respectively next adjacent, preceding and succeeding, each said half-integer baud sample storing delay stage in accordance with:

$$\Delta g [(i+\tfrac{1}{2})T]_{t=KT} = \tfrac{1}{2} \cdot \{\Delta g (iT)_{kt} [13/8] + \Delta g [(i+1)T]_{KT} \cdot [\tfrac{5}{8}]\}$$

where $\Delta g[(i+\tfrac{1}{2})T]$ identifies the tap gain setting adjustment for a given half-baud stage $(i+\tfrac{1}{2})$, $i = 1, 2, 3, \ldots n$, and $\Delta g(iT)$, and $\Delta g[(i+1)T]$ are the tap gain setting adjustments for the respective preceding and succeeding integer baud stages $(i)$ and $(i+1)$ in a current time interval K.

* * * * *

UNITED STATES PATENT AND TRADEMARK OFFICE
CERTIFICATE OF CORRECTION

PATENT NO. : 4,032,762
DATED : June 28, 1977
INVENTOR(S) : M. A. Caloyannides

It is certified that error appears in the above-identified patent and that said Letters Patent are hereby corrected as shown below:

Col. 1, line 60 after "00," insert -- 01 --.

Col. 3, line 18 after "only" insert -- on --.

Col. 5, line 62 after "equalizer" change "than" to -- then --.

Col. 8, line 33 after "0 =" change "F/j" to -- $\frac{E}{j}$ --.

Col.10, line 20 after "effective" change ""dealising"" to -- "dealiasing" --.

Col.15, line 22 after "be" change "furthher" to -- further --.

Col.16, line 38 change entire line to -- $g[(i+1/2)T]_{t=kt} = 1/2 \cdot \{g(iT)_{KT} \cdot [1+1/2+1/8] + g[(i+1)T]_{kT} \cdot [1-1/2+1/8]$ --.

Col.18, line 19 after "mean" change "swuare" to -- square --.

Col.20, line 44 after "since" change "R(Y)" to -- R(T) --.

Col.21, line 45 after "block" insert -- diagram --.

Col.22, line 62 after "i 2, ...)" delete "tapsboth" and before "the" insert -- at --.

Col.24, line 58 after "preceding" change "[(a-1)," to -- [(i-1), --.

Col.26, line 62 after " { x" change "(t+$\lambda$ " to -- (t+$\tau$ +$\lambda$) --.

Column 29, claim 8, after the equation insert: -- where $g[(i+1/2)T]$ identifies the tap gain setting for a given half-baud stage (i+1/2), i=1, 2, 3,...n, and g (iT) is the tap gain setting for the respective, preceding successively next adjacent integer baud stage (i) in a present and preceding baud intervals K, (K-1), and (K-2), respectively. --; line 30 after "$g[(i+1)T]_{KT}$" insert -- .$[1-1/2+1/8]$ --; same line 30, cancel ".$[1-1/2+1/8]$".

Column 31, line 1, change "$E_j e$" to -- $\frac{E}{j}$ --

UNITED STATES PATENT AND TRADEMARK OFFICE
CERTIFICATE OF CORRECTION

PATENT NO. : 4,032,762

DATED : June 28, 1977

INVENTOR(S) : M. A. Caloyannides

It is certified that error appears in the above-identified patent and that said Letters Patent are hereby corrected as shown below:

Col. 32, line 6 change entire line to -- $g[(i+1/2)T]_{t=kT} = 1/2 \cdot \{ g(iT)_{KT} \cdot [1+1/2+1/8] + g[(i+1)T]_{kT} \cdot [1-1/2+1/8]$ --; line 41 change "associted" to -- associated --; line 51 after "[9/4096]" change "]30" to -- + --; line 56 after "(i-1" change "j" to -- ) --; line 59 after "integer" change "baudstages" to -- baud stages --.

Col. 33, line 48 after "$]_{t=KT}$" insert --$\approx$--; line 49 after "$-\Delta g$" change "1T)" to -- iT --; line 50 after "$\Delta g[$" change ")" to -- ( --

Col. 34, lines 22 through 27 delete lines 22 through 27 in entirety; line 32 change "interger" to -- integer --; line 36 change "interger" to -- integer --; line 50 after "said" change "halfinterger" to -- half-integer --.

Col. 35, line 1 change "interger" to -- integer --; line 4 after "the" change "interger" to -- integer --.

*Signed and Sealed this*

*Seventh* Day of *February 1978*

[SEAL]

*Attest:*

RUTH C. MASON
*Attesting Officer*

LUTRELLE F. PARKER
*Acting Commissioner of Patents and Trademarks*